US011158056B2

(12) United States Patent
Lukac et al.

(10) Patent No.: US 11,158,056 B2
(45) Date of Patent: Oct. 26, 2021

(54) SURROUND CAMERA SYSTEM WITH SEAMLESS STITCHING FOR ARBITRARY VIEWPOINT SELECTION

(71) Applicant: Intel Corporation, Santa Clara, CA (US)

(72) Inventors: Rastislav Lukac, San Jose, CA (US);
Ravi Basavaraj, Sunnyvale, CA (US);
Gazi Naser Ali, Sunnyvale, CA (US);
Krishna Kumar Madaparambil, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 16/453,823

(22) Filed: Jun. 26, 2019

(65) Prior Publication Data

US 2019/0325580 A1 Oct. 24, 2019

(51) Int. Cl.
*G06K 9/36* (2006.01)
*G06T 7/12* (2017.01)
*H04N 5/232* (2006.01)
*G06T 3/40* (2006.01)

(52) U.S. Cl.
CPC .............. *G06T 7/12* (2017.01); *G06T 3/4038* (2013.01); *H04N 5/23238* (2013.01); *G06T 2207/20221* (2013.01)

(58) Field of Classification Search
CPC ..................... G06T 7/12; G06T 3/4038; G06T 2207/20221; H04N 5/23238
See application file for complete search history.

(56) References Cited

U.S. PATENT DOCUMENTS

| | | | |
|---|---|---|---|
| 2010/0246976 A1* | 9/2010 | Tolstaya | H04N 1/3876 382/218 |
| 2011/0141300 A1* | 6/2011 | Stec | H04N 5/232 348/222.1 |
| 2016/0286137 A1* | 9/2016 | Marks | H04N 5/23238 |
| 2017/0316565 A1* | 11/2017 | Leahy | A61B 3/12 |
| 2018/0330471 A1* | 11/2018 | Qin | G06T 5/50 |
| 2019/0291642 A1* | 9/2019 | Chae | B60R 1/00 |
| 2020/0020075 A1* | 1/2020 | Khwaja | G06T 3/4038 |

* cited by examiner

*Primary Examiner* — Dhaval V Patel
(74) *Attorney, Agent, or Firm* — Alliance IP, LLC

(57) ABSTRACT

An apparatus comprising a memory to store a first image captured by a first camera and a second image captured by a second camera; and a processor comprising circuitry, the processor to identify viewpoint information defining a view for a stitched image, the stitched image to be generated from a combination of a plurality of images comprising the first image and the second image; and based on the viewpoint information and a projection type, determine transformation parameters for at least one reference region associated with overlapping regions of the first image and the second image in order to: localize overlapping regions of the first image and the second image to determine stitching parameters; combine the first image and the second image using the stitching parameters; and assign data of the combined first image and the second image to the stitched image.

25 Claims, 14 Drawing Sheets

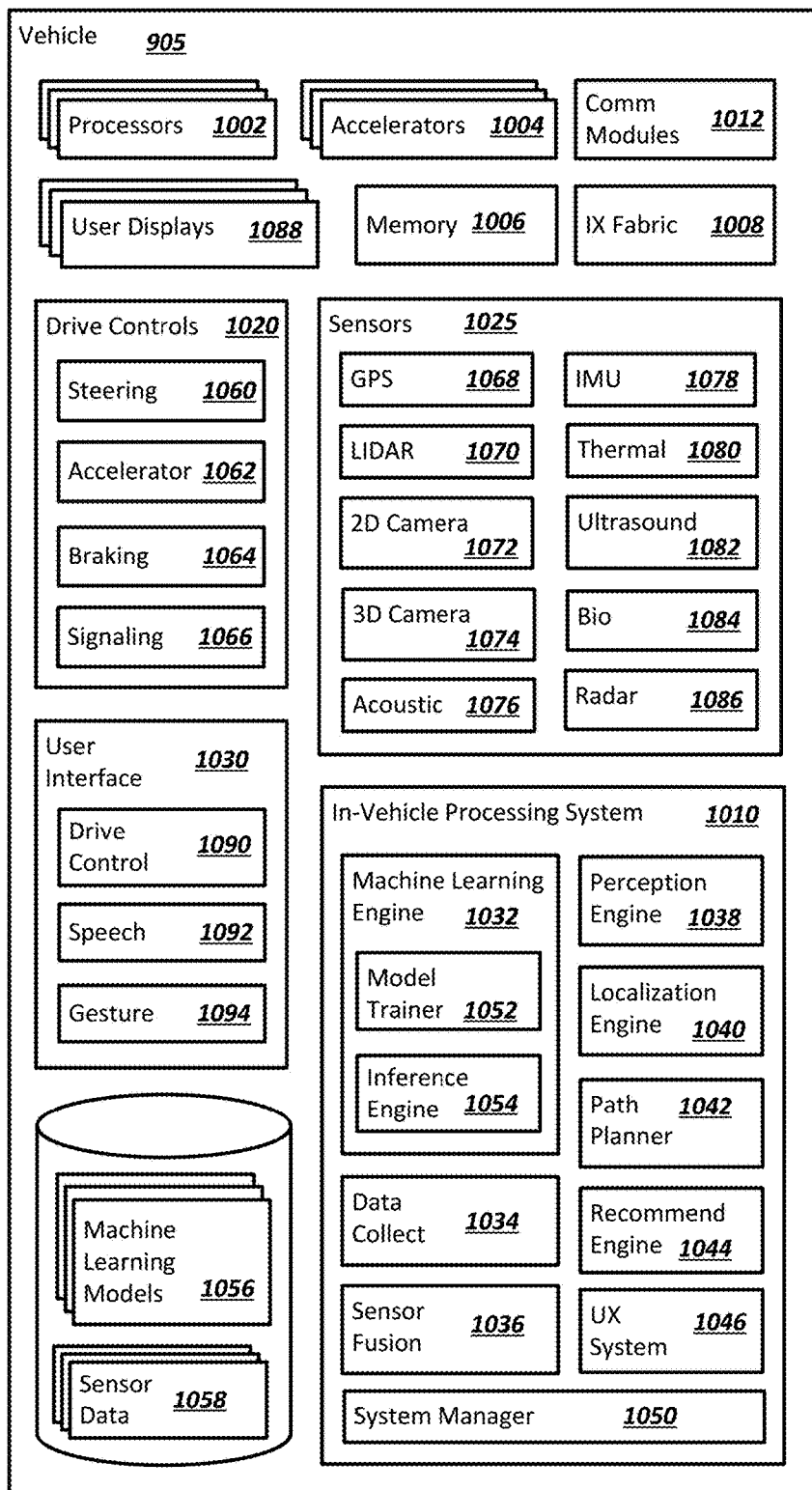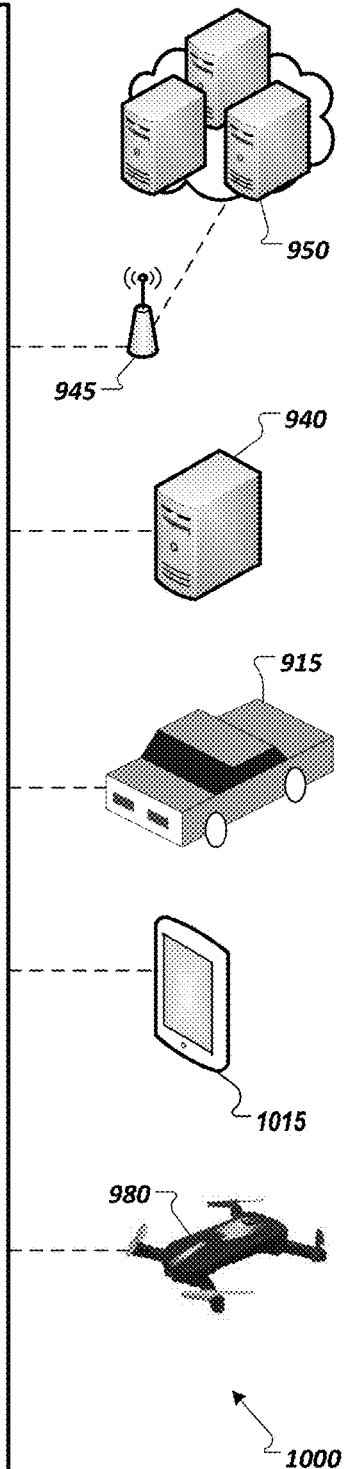
FIG. 10

SURROUND CAMERA SYSTEM WITH SEAMLESS STITCHING FOR ARBITRARY VIEWPOINT SELECTION

TECHNICAL FIELD

This disclosure relates in general to the field of computing systems and, more particularly, to computing systems facilitating camera imaging.

BACKGROUND

Automotive surround camera systems stitch together images from multiple cameras to create a complete 3D image of a vehicle's surroundings, which may serve various purposes, such as assisting the driver by allowing safer and easier maneuvering or providing support for insurance purposes. These systems have become increasingly important in the automotive industry due to their roles in safety (e.g., protecting against backover deaths and commonplace damages) and driver assistance (e.g., parking, blind spot elimination, perimeter scan, narrow road navigation), good performance, and cost effectiveness.

BRIEF DESCRIPTION OF THE DRAWINGS

FIG. 10 is a simplified block diagram illustrating an example implementation of a vehicle (and corresponding in-vehicle computing system) equipped with autonomous driving functionality in accordance with certain embodiments.

Like reference numbers and designations in the various drawings indicate like elements.

DESCRIPTION OF EXAMPLE EMBODIMENTS

Figure 1:
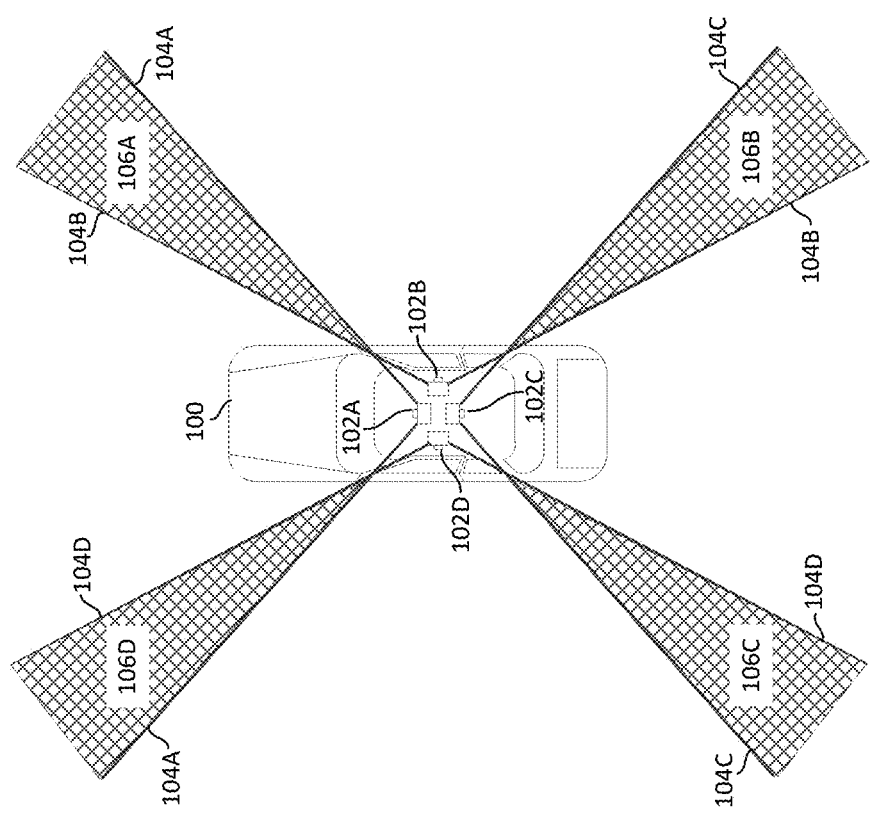
FIG. 1 illustrates a vehicle comprising a surround camera system in accordance with certain embodiments.

FIG. 1 illustrates a vehicle 100 comprising a surround camera system in accordance with certain embodiments. The system comprises four video cameras 102 mounted on vehicle 100, with a first camera 102A facing to the front, a second camera 102B facing to the right side, a third camera 102C facing to the rear, and a fourth camera 102D facing to the left side of the vehicle. In some embodiments, the cameras may include fish-eye lens equipped sensors (though any suitable sensors may be used) to capture relatively wide fields of view in order to produce overlaps in the images captured by adjacent cameras. For example, in the depicted embodiment, camera 102A captures a field of view within boundaries 104A, camera 102B captures a field of view within boundaries 104B, camera 102C captures a field of view within boundaries 104C, camera 102D captures a field of view within boundaries 104D. In the depicted embodiment, each camera captures an image that has a portion that overlaps with an image captured by another camera. For example, an image captured by camera 102A and an image captured by camera 102B may have an overlap region 106A, an image captured by camera 102B and an image captured by camera 102C may have an overlap region 106B, an image captured by camera 102C and an image captured by camera 102D may have an overlap region 106C, and an image captured by camera 102D and an image captured by camera 102A may have an overlap region 106D.

Images or video streams (which may comprise a stream of images) from all four cameras may be merged or stitched together into a single panoramic image or stream by a processor. The resulting panoramic video stream may then be recorded and/or displayed on a monitor (e.g., of the vehicle 100) in real time without any blind spots. The surround camera system is often used for lower speeds (e.g., under 20 mph) to assist with parking, maneuvering in complex conditions (e.g., narrow roads, difficult terrain), security perimeter scans, etc.

The various use cases involving images stitched together may be dependent on the provision of the correct portion of a scene and accurate information contents. The former relates to viewpoint selection while the latter involves seamless stitching of adjacent cameras through their geometric and photometric alignment. However, in some systems, surround camera systems supports only a few predefined views, such as surround (360°), side, and wide front or rear views, which cannot be further refined. Moreover, image alignment solutions may suffer from various drawbacks, especially in situations with varying lighting conditions and more complex scenes. The same object captured by adjacent cameras can have different brightness levels or white balance due to different camera mount angles or scene illumination, thus leading to undesired quality effects in the final displayed or recorded stitched image.

Even a scene with a plain road background can be heavily affected by varying lighting conditions and shadows due to the car itself or objects in its proximity. Brightness differences can also be attributed to exposing each camera for its own field of view to avoid underexposure (resulting in noise) or overexposure (resulting in saturation) effects. These exposure differences can be reduced by controlling all cameras jointly; for example, by exposing them identically as the primary (e.g., front) camera; however, this approach may produce different exposure errors for each secondary camera since both illumination and scene contents vary from camera to camera. Similarly, color differences are often caused by different illumination and scene contents seen by each camera. Other factors, such as module-to-module variations, can usually be calibrated offline and compensated per camera earlier in the imaging pipeline (outside of the stitching block).

As discussed above, existing solutions are not flexible enough, as they usually support only a few predefined views, which may only partially include or even completely omit the actual regions of interests. In addition, despite using various optimized profiles and parameters associated with these predefined views, these systems often produce large alignment errors, which are either completely propagated to the final images or at best somewhat masked (e.g., by inserting lines to separate source cameras in the stitched image). However, in complex scenes, this approach may create significant driving safety and operational risks, as important image features in seam regions can be severely distorted or even completely hidden due to alignment errors, masking effects, and incorrect brightness and contrast characteristics.

Various embodiments of the present disclosure provide an advanced and efficient solution to generate arbitrary and seamless views using surround camera systems. Particular embodiments may provide practical solutions for achieving seamless stitching in surround camera systems for an arbitrary viewpoint. In a certain embodiment, a unique and efficient photometric alignment method mitigates brightness and color differences between adjacent cameras due to different camera mount angles, sensor characteristics, and varying illumination across the scene. In various embodiments, viewpoint information is used to determine the boundaries of overlapping regions for each pair of adjacent cameras and to configure blending masks for seamlessly stitching images together. Statistics collected in overlapping regions may be used to calculate adjustment gains, which reflect changes in viewpoint and scene contents, and the adjustment gains may be constrained through suitable criteria to avoid undershoots causing image darkening and overshoots resulting in saturation effects. The adjustment gains may be combined with the blending masks to minimize alignment errors and obtain stitching parameters which are applied to the input images to produce the output stitched image.

Various embodiments enable flexible and accurate viewpoint selection in surround camera systems and seamless stitching of images taken with multiple cameras using viewpoint-adaptive statistics collection and image alignment. The user experience may be improved in various multicamera stitching use cases, e.g., by creating a complete view (360 degrees) of object surroundings, assisting the driver by enabling safer and easier vehicle maneuvering, and recording multiple cameras connected together. Particular embodiments may enable a focus on the relevant portion of scene and relevant information contents, instead of distracting the user with suboptimal views and undesired quality effects in the stitched output. Various embodiments described herein may be suitable for both still image and video captures (which may represent a stream of images), may be memory efficient, and may be efficiently implemented in software and hardware. The image stitching procedures may be used in a stand-alone solution or implemented as part of the data processing pipeline through combinations of the techniques described in this disclosure. Particular embodiments may greatly enhance image quality by mitigating or completely avoiding various alignment errors, which would otherwise result in significant brightness and color differences between adjacent cameras. Finally, some embodiments herein may support advanced projections (e.g., composite views, arbitrary viewpoints) to provide more information, differentiation, higher flexibility, and better quality compared to existing automotive solutions.

Figure 2:
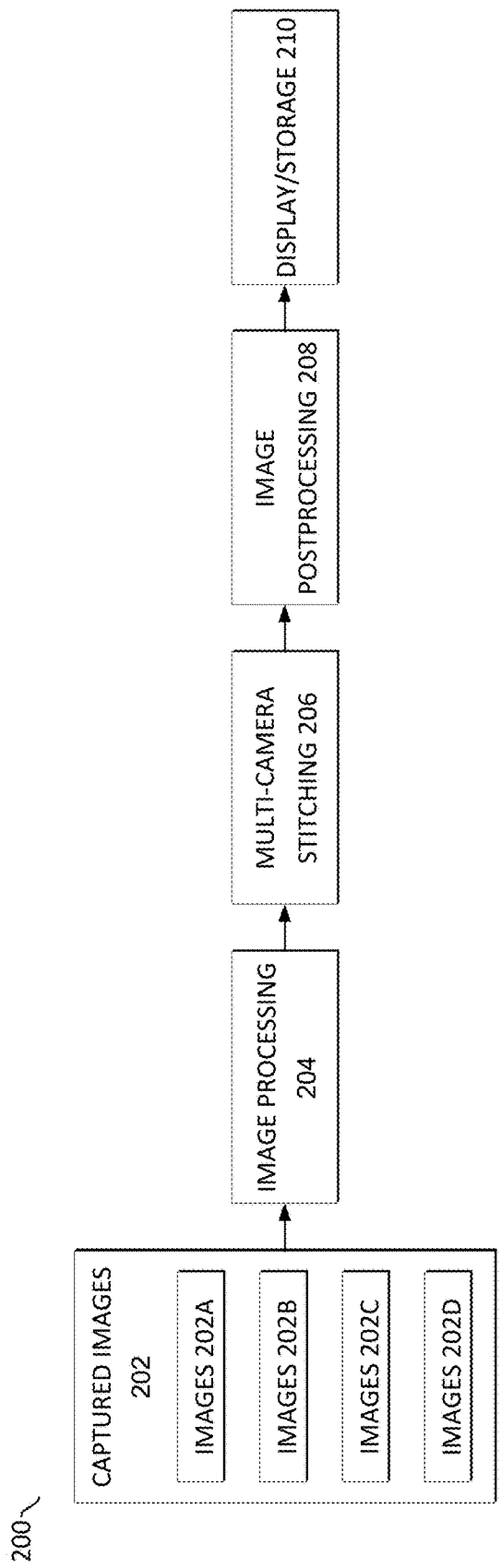
FIG. 2 illustrates a flow for generating a stitched image from multiple images in accordance with certain embodiments.

FIG. 2 illustrates a flow 200 for generating a stitched image from multiple images in accordance with certain embodiments. Captured images 202 represent images captured by different cameras. For example, images 202A may be captured by camera 102A, images 202B may be captured by camera 102B, images 202C may be captured by camera 102C, and images 202D may be captured by camera 102D. In various embodiments, a set of images captured at a particular point in time may be associated together (e.g., via a timestamp or other indications) and processed to form a stitched image.

After being captured, the images 202 undergo various processing by image processing module 204. For example, image processing module 204 may perform any combination of black level correction, defective pixel correction, noise reduction, white balance, color correction, and tone mapping. Image processing module 204 may also perform processing to account for lens distortion and geometric alignment (e.g., through rotation, translation, and scaling) to produce projections in a common coordinate space (e.g., a world coordinate space). For example, prior to processing, the data of the images 202 may each be represented according to a coordinate system that is unique to the type of the camera that captured the image (e.g., a model or local coordinate system) and after processing, the data of the images 202 may be represented in a common coordinate space relative to a common origin within the common coordinate space (e.g., based on the particular camera's height, position, and angle).

Multi-camera stitching module 206 synthesizes a stitched image using the processed images from the multiple cameras. Since such images are likely to show variations in brightness and color due to different lens and sensor characteristics, 3A limitations, calibration errors, and processing differences, multi-camera stitching module 206 may perform image adjustment (e.g., photometric alignment) and blending to make the stitched output appear seamless for improved user experience and accuracy. Such processing may include mitigation of color and brightness differences in images captured by different cameras.

The stitched image may then be processed by image postprocessing module 208. Such postprocessing may include any suitable operations, such as one or more of sharpening, rendering, resampling, and format conversion to enhance the final image quality and comply with output media requirements. The resulting image is then displayed on a monitor (e.g., of a vehicle or a monitor remote from the vehicle) or stored in memory by module 210.

Figure 3:
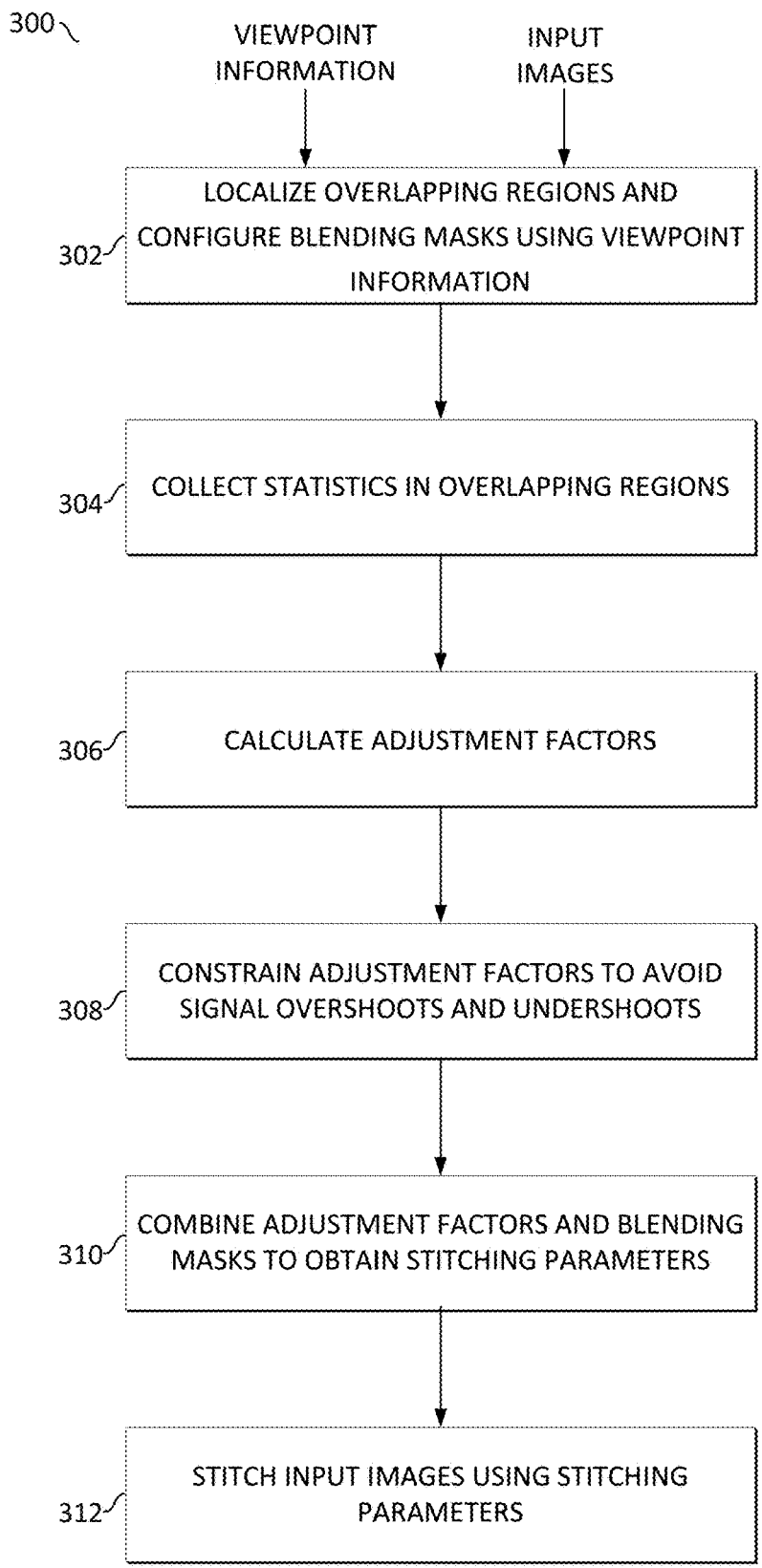
FIG. 3 illustrates a flow for generating stitched images based on stitching parameters in accordance with certain embodiments.

FIG. 3 illustrates a flow 300 for generating stitching parameters and stitching images together based on the stitching parameters in accordance with certain embodiments. The flow may be performed by a processor comprising any suitable circuitry, such as multi-camera stitching module 206.

The flow may operate on input images from multiple different cameras, such as captured images 202. The input images are assumed to be compensated for lens distortion and geometrically aligned by suitable circuitry (e.g., image processing module 204) before stitching operations are performed in the processing pipeline.

The flow may also operate on viewpoint information indicating a desired view for the stitched image. This view may be produced for a certain projection type (e.g., mapping of the input camera images into an output image plane) and a certain viewpoint (e.g., a position or perspective from which the scene is rendered and viewed). In various embodiments, a user or a computing entity may specify the view, the projection, and/or the viewpoint, e.g., depending on the use case or driving situations.

For instance, automotive camera systems may use a surround view (based on rectilinear projection, sometimes referred to as planar projection), a second surround view (based on 2D composite bowl projection), a rear-tilt view (based on 2D composite bowl projection), and a side view (based on rectilinear projection), a front or rear view (based on rectilinear projection), or other suitable view. In various embodiments, each view may utilize a particular projection type (e.g., rectilinear, 2D composite bowl, cylindrical, spherical, Panini, or other suitable projection). The computing entity may specify a suitable view, projection, and/or viewpoint based on a driving situation and scene/image analysis, whereas the user can manually make such a choice using a graphical user interface (GUI), voice control, dedicated buttons, and so on.

The viewpoint may comprise a reference point, such as a three-dimensional (3D) coordinate or a vector specified by its length (e.g., size, distance, magnitude) and direction (e.g., angle or orientation) in a given coordinate space. In addition or as an alternative to defining the viewpoint with respect to an origin of a coordinate space, the viewpoint may be defined based on another suitable point in that coordinate space. For instance, the viewpoint may be defined as a vector originating in the previous viewpoint. Alternatively, the viewpoint may be defined as a change or difference in coordinates with respect to the previous viewpoint or other suitable point. In some embodiments, the viewpoint may be defined using a set of angle values (e.g., rotation parameters) and offset values (e.g., translation parameters) with respect to each axis or plane of a given coordinate system. In various embodiments, the viewpoint is defined in any suitable coordinate space, such as the common coordinate space or the coordinate space of the coordinate system used to render the final view (e.g., in order to simplify selection of the viewpoint for the user). As used herein, a reference viewpoint may refer to a previous viewpoint or a default viewpoint determined via calibration.

In various embodiments, the viewpoint information may be dynamically specified by the user. For example, the user may specify the viewpoint information by specifying a coordinate directly; touching a point on a screen; selecting a predefined view, viewpoint, or other setting; or defining such settings through voice control. For example, a user may be given the option to change the viewpoint of a 2D composite bowl projection from a default viewpoint (e.g., a top-down view) to any other desirable viewpoint.

In a particular embodiment, the viewpoint information may include information based on the projection type and the viewpoint setting. In embodiments, this information may comprise a plurality of rotation angles with respect to the axes of the common coordinate system and one or more translation parameters (these rotation angles and translation parameters may also be referred to as transformation parameters). For example, the viewpoint information may include a rotation angle about the x axis ($\alpha$), a rotation angle about the y axis ($\beta$), and a rotation angle about the z axis ($\gamma$), as well as a 3D translation parameter (T). In various embodiments, rotation parameters may be defined in degrees (e.g., ranging from −45 to 45 degrees), whereas translation parameters may be defined in pixel units. The range of translation parameter values associated with x and y axes usually depends on the output image resolution, while the parameter value associated with the z axis represents a zooming factor (e.g., smaller absolute values produce more zoom-in). Depending on implementation, rotation and translation parameters can have both positive and negative values. As a first example, for a 2D composite bowl view: $\alpha=0$, $\beta=0$, $\gamma=0$, and T=[0 0 −1800]'. As another example, for a rear tilt view: $\alpha=20$, $\beta=25$, $\gamma=0$, and T=[750 600 −1800]'. Other common examples include rear view with $\alpha=25.0$, $\beta=0$, $\gamma=0$, and T=[0 1500 −1800]', front view with $\alpha=-25$, $\beta=0$, $\gamma=0$, and T=[0 −1500 −1800]', right-curb view with $\alpha=0$, $\beta=20$, $\gamma=0$, and T=[1500 0 −1800]', and left curb view with $\alpha=0$, $\beta=-20$, $\gamma=0$, and T=[−1500 0 −1800]'.

At 302, overlapping regions of the images are localized and blending masks are configured using the viewpoint information. Localization may include determining the boundaries of the overlapping regions in the common coordinate space (e.g., world coordinate system) and converting these coordinates based on the viewpoint.

The size, shape, and position of the overlapping region in images captured by two adjacent cameras depends on the lens field of view, the placement of the cameras on the vehicle, the projection type, and the viewpoint information. The lens field of view and the placement of the cameras are generally static and may be characterized through offline calibration for use in the determination of the size and position of the overlapping regions of the cameras. However, the projection type and viewpoint information may be dynamic, depending on a user selection or a situation associated with the vehicle. For example, a first combination of projection type and viewpoint information may be used for driving and a second combination of projection type and viewpoint information may be used for parallel parking. Any change in viewpoint and projection type may affect various attributes of overlapping regions, such as coordinates, position/location, shape, boundaries, size/area, orientation, and so on.

Coordinates in the common coordinate space of the overlapping regions in images captured by each pair of adjacent cameras may be determined (e.g., based on the coordinates assigned by the image processing module 204). For example, an image captured by a first camera may overlap with an image captured by a second camera at pixels that have the same coordinates in the common coordinate space. For some common projections and viewpoints, overlapping regions may be determined through calibration. Such overlapping regions, determined in calibration or calculated for previous viewpoints and/or projections, are referred to herein as reference regions and may be used to localize overlapping regions when generating new views. This localization may be done via transformation (e.g., function, mapping, conversion, change, modification, revision, variation, etc.) of reference regions' attributes, typically coordinates, based on the change of viewpoint and projection between the default/reference view and the actual view. Such coordinate change may imply changes of other attributes mentioned above. In various embodiments, this transformation may be controlled using a plurality of parameters, referred to herein as transformation parameters, such as rotation and translation parameters, determined with respect to reference regions. Thus, if a reference region is associated with a previous viewpoint and/or projection (as opposed to a default reference region, e.g., associated with calibration), the example transformation parameters described above for various viewpoints and projections may be modified according to the previous viewpoint and/or projection.

In some embodiments, the actual transformation parameters (i.e., transformation parameters for the actual viewpoint) may be determined using transformation parameters optimized or tuned to produce the desired image quality for a plurality of viewpoints, referred to herein as tuning viewpoints, per each of supported projections. This tuning may be done offline, for instance, as part of surround camera system calibration or image processing pipeline tuning and performance optimization. Transformation parameters for tuning viewpoints may be stored as a list, a look-up table, a sampling grid, or in other suitable form. Depending on implementation, one or more of tuning viewpoints closest to the actual viewpoint may be selected from a plurality of tuning points based on Manhattan, Euclidean, Minkowski, or angular distance, or some other distance, similarity measure, or function suitable for quantifying differences or similarities between the two viewpoints in a given coordinate space. In some embodiments, transformation parameters associated with selected tuning viewpoints may be averaged to obtain the actual transformation parameters. In some other embodiments, each selected tuning viewpoint may be associated with a weight corresponding to a difference or similarity of that tuning viewpoint and the actual viewpoint. The actual transformation parameters are then obtained as a weighted average of transformation parameters associated with selected tuning viewpoints. In yet some other embodiments, the actual transformation parameters are determined using transformation parameters associated with a plurality of tuning viewpoints through interpolation, filtering, estimation, and/or other suitable process.

A reference region may also be associated with a previous viewpoint and/or projection (as opposed to a default view with a predefined viewpoint and a predefined projection). In this case, transformation parameters associated with a plurality of tuning viewpoints may be first updated, compensated, normalized, or otherwise adjusted with respect to the previous viewpoint before determining the actual transformation parameters using one or more procedures discussed above. In some other embodiments, the actual transformation parameters may be obtained (e.g., based on transformation parameters or a viewpoint associated with a reference region) using one or more linear two- or three-dimensional transformations (e.g., translation, rotation, scaling) and/or perspective transformations based on changes in at least one of the viewpoint information and the projection type.

Based on the coordinates of the overlapping regions, a statistics grid may be determined. The statistics grid positions (e.g., of a 2D composite bowl projection) are first defined in the common coordinate space (e.g., world coordinate system) in which the viewpoints are defined. In one example, the grid may be a rectangle (or other suitable shape) that includes all of the overlapping region between two images. In another example, the grid may be a rectangle (or other suitable shape) that includes a majority of the overlapping region (e.g., around 90% of the overlapping region). In other examples, the grid may include any suitable amount of the overlapping region.

As an example, when a grid is expressed as a rectangle, the positioning of the grid may be expressed as follows:

grid_pos_tl=[x_tl y_tl 0] for the top-left corner grid_pos_tr=[x_tr y_tr 0] for the top-right corner grid_pos_bl=[x_bl y_bl 0] for the bottom-left corner grid_pos_br=[x_br y_br 0] for the bottom-right corner After the grid positions are defined, they are rotated and translated based on the viewpoint information. Each rotation angle can be compensated for through its own rotation matrix and the overall rotation, defined as product of individual rotation matrices, can be combined with translation to obtain the transformed coordinates as follows.

A rotation matrix for rotation about each axis may be computed, where $R_\alpha$ represents a rotation matrix to compensate for rotation about the x axis, $R_\beta$ represents a rotation matrix to compensate for rotation about the $\gamma$ axis, and $R_\gamma$ represents a rotation matrix to compensate for rotation about the z axis. For example:

$$R_\alpha = \begin{bmatrix} 1 & 0 & 0 \\ 0 & \cos(\alpha) & -\sin(\alpha) \\ 0 & \sin(\alpha) & \cos(\alpha) \end{bmatrix}$$

$$R_\beta = \begin{bmatrix} \cos(\beta) & 0 & -\sin(\beta) \\ 0 & 1 & 0 \\ \sin(\beta) & 0 & \cos(\beta) \end{bmatrix}$$

$$R_\gamma = \begin{bmatrix} \cos(\gamma) & -\sin(\gamma) & 0 \\ \sin(\gamma) & \cos(\gamma) & 0 \\ 0 & 0 & 1 \end{bmatrix}$$

The rotation matrices may be applied in the following order: $R = R_\alpha R_\beta R_\gamma$. As alluded to above, the translation vector in the 3D common coordinate space may be defined as T=[tx ty tz]'. Combining the rotation matrix R and the translation vector T results in matrix E expressed in homogenous coordinates:

$$E = \begin{bmatrix} R & -R*T \\ 0 & 1 \end{bmatrix}$$

The grid positions in the common coordinate space are each multiplied by E to obtain the transformed positions (the positions based on the viewpoint). For example, grid_tl_t=E*[grid_tl 1]'→[x_tl_t y_tl_t z_tl_t 1]'=E*[x_tl y_tl 0 1]'.

The coordinates in the image plane (e.g., projection coordinate system) are then obtained by using perspective projection: grid_tl'=[x_tl' y_tl']=[f*x_tl_t/z_tl_t f*y_tl_t/z_tl_t]+[w/2 h/2], where f is the focal length of virtual camera, whereas w and h are the width and the height of the image. The other corners of the grid (i.e., grid_tr, grid_bl, and grid_br) are similarly transformed to obtain the new positions of the grid based on the selected viewpoint. In a similar manner, the grid positions for other pairs of overlapping images may be calculated (e.g., positions for a first grid for overlapping region 106A, a second grid for overlapping region 106B, a third grid for overlapping region 106C, and a fourth grid for overlapping region 106D may be calculated).

In various embodiments, the transformed positions of the grid(s) may be calculated periodically (e.g., each frame) or upon a change to the viewpoint information. In some embodiments, the transformed positions of the grid(s) may be stored in memory and reused for different sets of images processed (e.g., each set may correspond to a particular instant of time).

At 302, blending masks may also be configured using the viewpoint information. A blending mask may comprise a set of blending coefficients defining how a plurality of images are to be blended together. The blending coefficients can be predetermined (e.g., for common viewpoints and projections) or adaptively obtained using a suitable function. In one example, a blending coefficient may specify a first multiplier for a pixel (or multiple pixels) of a first image captured by a first camera and a second multiplier for a corresponding overlapping pixel (or multiple pixels) of a second image captured by a second camera. The value of a pixel in the stitched image may be obtained by multiplying a value of the pixel of the first image by the first multiplier and adding it to a value of the pixel of the second image multiplied by the second multiplier. The value of a pixel may be expressed in any suitable manner. For example, a pixel may include one or more values indicating a color of the pixel (e.g., RGB pixel values, chrominance values, a hue value, saturation value, angle/orientation of a color vector in a color space, or other suitable value) or one or more values indicating a brightness of the pixel (e.g., a brightness value, luminance value, intensity value, magnitude, or other suitable value).

In some embodiments, a center of the image or a center or other point or region of the rotated and translated grid including at least a portion of an overlapping region, or a line originating from the viewpoint and crossing such a point may serve as a reference when configuring a blending mask. Blending coefficients of the mask may be obtained as a function of the distance from the reference point or line. For example, a first image may more heavily influence pixels that are in the overlap region closer to the portion of the first image that does not overlap with a second image, while the second image may more heavily influence pixels that are in the overlap region closer to the portion of the second image that does not overlap with the first image. In various embodiments, tunable linear or exponential functions may be used to blend the pixels along the image lines, columns, or in both directions simultaneously. A blending mask may specify blending coefficients per pixel, per block, or per other suitable group of pixels. In some embodiments, blending masks may be obtained via transformations or some other suitable functions of the reference masks (i.e., blending masks determined for reference regions/views). Building upon the mapping of reference masks' coordinates and coefficients, this process determines (e.g., via interpolation, filtering, or estimation) blending coefficients for the actual view. In some embodiment, this process can use transformations obtained for localizing overlapping regions. In other embodiments, reference blending masks can be updated using parameters prior to determining blending masks for the actual view. Alternatively, blending masks obtained using transformations of reference masks may be subject to further adjustment via parameters.

At 304, statistics are collected in the overlapping regions. For example, these statistics may be collected based on pixels from the images within the grids described above (that have been rotated and translated, or otherwise transformed or adjusted, based on the viewpoint information). In some embodiments, the grids may include some pixels that are not shared by both images with overlapping regions or may not include some of the pixels that are present in both images with overlapping regions, but the grid may still provide a relatively accurate proxy for the entire overlapping region.

The pixels from overlapping regions are used to collect statistics for each of two adjacent cameras associated with the overlapping region of interest. This process may involve all such regions and cameras or alternatively may involve at least one such region (i.e., one pair of adjacent cameras). In various embodiments, the statistics can be calculated using all pixels from the overlapping region or some subsets of these pixels (e.g., omitting invalid or occluded pixels, using only an inner portion of overlapping regions, using only a sampling of pixels of the overlapping regions, etc.). The statistics may be calculated per the entire overlapping region or on a block-by-block basis (for example, first statistics may be calculated for a first block of the grid, second statistics may be calculated for a second block of the grid, and so on).

One or more types of statistics may be collected for each overlapping region. As an example, color statistics (e.g., based on values indicating colors of pixels) or brightness statistics (e.g., based on values indicating brightness of pixels) may be collected.

Any suitable operator may be used to collect the statistics. For example, a mean of values of a group of pixels, a median of values of a group of pixels, or other statistical measure of values of pixels of a grid representing an overlapping region (or subset thereof) may be collected.

The number of pixels employed in the statistic calculations may vary (e.g., video compression formats may use a higher luminance resolution and lower chrominance resolution) to collect statistics to be used to perform at least one of brightness and color adjustments.

In one embodiment, the following statistics may be collected for one or both of pixel brightness values and pixel color values (alternatively, similar statistics could be collected using median values or other statistical operators):

For an image from camera 102A: mean_AB denotes the mean of values of all pixels within the grid representing the overlapping region of camera 102A with camera 102B and mean_AD denotes the mean of values of all pixels within the grid representing the overlapping region of camera 102A with camera 102D.

For an image from camera 102B: mean_BA denotes the mean of values of all pixels within the grid representing the overlapping region of camera 102B with camera 102A and mean_BC denotes the mean of values of all pixels within the grid representing the overlapping region of camera 102B with camera 102C.

For an image from camera 102C: mean_CB denotes the mean of values of all pixels within the grid representing the overlapping region of camera 102C with camera 102B and mean_CD denotes the mean of values of all pixels within the grid representing the overlapping region of camera 102C with camera 102D.

For an image from camera 102D: mean_DC denotes the mean of values of all pixels within the grid overlapping the overlapping region of camera 102D with camera 102C and mean_DA denotes the mean of values of all pixels within the grid representing the overlapping region of camera 102D with camera 102A.

At 306, adjustment factors are calculated based on the statistics. In one embodiment, the adjustment factors have the form of ratios between the statistics from an image from one camera and the statistics from an image of another camera associated with the same overlapping region. In another embodiment, the adjustment factors are calculated as a combination (e.g., average or weighted average) of such ratios from both overlapping regions associated with the same camera of interest. As an example, continuing with the example mean statistics described above, the calculation of an adjustment factor for camera 102A may be as follows:

adjustmentFactor_$A$=(mean_$DA$/mean_$AD$+ mean_$BA$/mean_$AB$)/2

Similarly, the calculation of a compensation gain factor for camera 102C may be as follows:

adjustmentFactor_$C$=(mean_$BC$/mean_$CB$+mean_$DC$/mean_$CD$)/2

In this example, the same adjustment factor is applied to the entire image of camera 102A and a different adjustment factor is applied to the entire image of camera 102C, while no adjustment factor is applied to the images of cameras 102B and 102D. However, in other embodiments, one or more adjustment factors may be applied to an image (e.g., a first adjustment factor for a first portion of the image, a second adjustment factor for a second portion of the image, and so on) or each image of all cameras (or a subset thereof) may have one or more adjustment factors applied to one or more portions of the respective images. In one embodiment, an adjustment factor may be determined for a particular position of an image and the actual adjustment applied to a pixel of the image may be a function of the distance of that pixel from the position of the image.

At 308, the adjustment factors are constrained. For example, the adjustment factors may be constrained by applying suitable criteria to avoid signal undershoots and overshoots in the stitched image. Since the adjustment factor calculations can produce adjustment factors that are too small or too large for some pixels in images with complex illumination or scenes, the adjustment factor values may be constrained, for example, by applying one or more predefined criteria.

Such a constraint may have the form of a clipping function, which replaces the original adjustment factor value with the lower of the original factor value and a predetermined parameter. Similarly, another clipping function can be used to replace the original adjustment factor value with the greater of the original factor value and another predetermined parameter, which is smaller than the predetermined parameter in the previous clipping function. In some embodiments, the absolute difference between the original and adjusted pixel values is constrained by a predetermined threshold. In other embodiments, this threshold is a function of the original pixel value; for example, expressed as a percentage, multiplier, or factor of the original pixel value. Alternatively, the original adjustment factor value may be replaced with the predetermined parameter if a pixel value (or a threshold number of pixel values) from the overlapping region of interest multiplied by the original adjustment factor value exceeds a maximum value for a given bit representation of the pixel value (thus causing saturation or overflow for the pixel). To avoid saturation effects, the adjustment factor is clipped appropriately. One example implementation is described below, where maxValue is the highest value of a pixel in one of the overlapping regions of an image and satThreshold is a lower bound of the saturation range:

maxValue=max(max(region of interest of camera 102$A$ that overlaps with camera 102$B$),max(region of interest of camera 102$A$ that overlaps with camera 102$D$));

adjustmentFactor=satThreshold/maxValue if maxValue*adjustmentFactor>satThreshold For an 8 bit image, satThreshold could be set, for instance, to a value between 240 and 245.

At 310, the adjustment factors (e.g., as constrained) and blending masks are combined to obtain stitching parameters. For example, for any particular pixel of a first image, the blending mask may specify a weight representing that pixel's contribution to the corresponding pixel of the stitched image and a brightness adjustment factor may specify an adjustment of a brightness value of that pixel (the blending mask or brightness adjustment factor may be specified at a granularity that is greater than one pixel, yet still provide the relevant information for each pixel of the image or a subset thereof). The stitching parameter for that particular pixel may then be obtained by multiplying the weight representing the pixel's contribution with the brightness adjustment factor. This stitching parameter may then be multiplied with the brightness value of the pixel to determine a corrected or adjusted brightness value that may be added to a similar corrected or adjusted brightness value from a corresponding pixel of a second image that overlaps with the first image. As an example of the above, for a particular pixel of the stitched image, the combined adjustment factors and blending masks may specify that the corrected pixel is to be determined as follows:

stitched_brightness_value=blending_coefficient$_1$*brightness_adjustment_factor$_1$*pixel$_1$_brightness_value+ blending_coefficient$_2$*brightness_adjustment_factor$_2$*pixel$_2$_brightness_value where the subscript 1 refers to a pixel of a first image of a first camera and the subscript 2 refers to a pixel of a second image of a second camera, where the second image overlaps with the first image.

In another example, pixels of only one of the images may have adjustment factors applied in which case the above equation may become:

stitched_brightness_value=blending_coefficient$_1$*brightness_adjustment_factor$_1$*pixel$_1$_brightness_value+ blending_coefficient$_2$*pixel$_2$_brightness_value.

In other examples, the corrected value from one image may be used as the final pixel value (without a contribution from the second image):

stitched_brightness_value=brightness_adjustment_factor$_1$*pixel$_1$_brightness_value.

In yet another example, the pixel value from one image may be directly combined with the pixel value from the second image, without the use of adjustment factors:

stitched_brightness_value=blending_coefficient$_1$*pixel$_1$_brightness_value+blending_coefficient$_2$*pixel$_2$_brightness_value.

In general, the final stitching parameters are obtained using at least one of the adjustment factors and the spatial blending masks. In various embodiments, similar processes may be followed with respect to generating the final stitching parameters based on at least one of the color adjustment factors and the spatial blending masks and/or at least one of the brightness adjustment factors and the spatial blending masks. Any suitable variations of the above are contemplated herein. For example, in case of a single adjustment factor per camera, the stitching parameters for the pixels associated with a camera of interest can be set to the value of the adjustment factor applicable to that camera. As another example, the adjustment factors from two overlapping regions associated with the same camera can be used to interpolate the stitching parameters in each pixel location depending on the pixel distances from one or more points of reference.

At 312, the input images are stitched together using the stitching parameters. In one embodiment, the stitching parameters are applied to the image associated with the camera of interest on a pixel-by-pixel basis. The stitched pixels are calculated as a function of the input pixel values and the final stitching parameters. For instance, (as illustrated above) in case of rational adjustment factors, the stitched pixel value is obtained as product of the input pixel value and the stitching parameters associated with this pixel location.

In some embodiments, only select (e.g., every other) cameras' image brightness and/or color is adjusted while portions of the unselected camera's images are included in the stitched image without any adjustment to the brightness and/or color of these portions. In other embodiments (as alluded to above), pixels from each of the overlapping cameras may have stitching parameters applied to them and the resulting values may be summed together to obtain the final pixel values.

Once the input images have been stitched together, the output image may then be stored in memory, displayed on a monitor, communicated to another computing entity or module, or otherwise utilized.

In various embodiments, the flow performed by the multi-camera stitching module (e.g., 206) may omit depicted operations or include additional operations. As an example, the stitching module may perform projection refinement to validate or improve the geometric alignment settings. Since geometric alignment in surround camera systems typically relies on calibration, the alignment may lose its accuracy over time due to mechanical changes in the mounting of the cameras resulting in camera position changes. In some embodiments, the projection refinement process may quickly validate default geometric alignment settings and may subsequently perform more comprehensive image analysis to correct the geometric alignment settings (and may store updated geometric alignment settings for future use) prior to performing image alignment. In some embodiments, the projection refinement process may be directly performed on images geometrically aligned (e.g., by image processing module 204) and may refine the images through geometrical transformations to produce the final projections used for stitching.

Projection refinement may seek reference point in images from two overlapping cameras. In various embodiments, the refinement process may utilize any one or more of feature extraction and matching, corner detection, template matching, semantic segmentation, object detection, image registration, trained classifiers (machine learning), or other techniques to adaptively maximize similarities in the overlapping region in images from two neighboring cameras.

As another example, the stitching module may perform processing to suppress errors caused by one or more of data alignment, image registration, feature extraction, matching, and repetition, ghosting due to motion, and parallax. It may also employ (in addition or as an alternative to the blending and photometric alignment described herein) object segmentation, semantic processing, depth information, and multi-resolution analysis to further guide or enhance the image stitching process.

Figure 4:
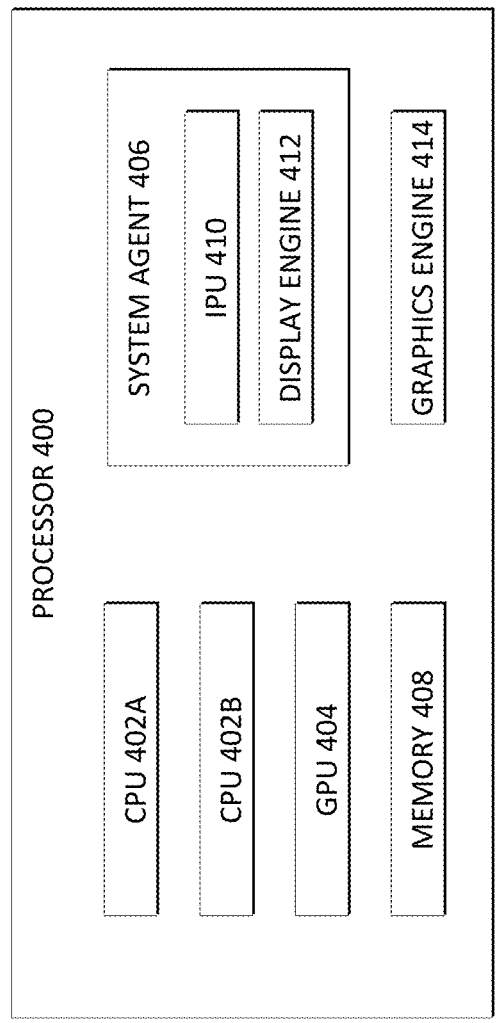
FIG. 4 illustrates a processor in accordance with certain embodiments.

FIG. 4 illustrates a processor 400 in accordance with certain embodiments. Processor 400 represents a System on Chip (SoC) and includes a plurality of Central Processing Units (CPUs) 402A and 402B, a Graphics Processing Unit (GPU) 404, a system agent 406 comprising an Image Processing Unit (IPU) 410 and display engine 412, memory 408, and graphics engine 414. The image stitching operations described above may take place in whole or in part on any of the CPUs, GPU, and/or IPU. In various embodiments, in order to achieve one or more of lower latency, high area and power efficiency, scalability, and customization for multiple camera streams and different views, the image stitching operations described herein may be implemented on GPU 404 and/or IPU 406. Like named components in FIG. 5 and the other FIGs. may share any suitable characteristics.

A single IPU generally serially processes images from multiple cameras; however, other architectures contemplated herein may be able to handle multiple input streams in a parallel manner. The intermediate outputs, after various preprocessing and image processing operations previously discussed in relation to FIG. 2, may be collected in memory 408 (e.g., DDR or other suitable memory) before undergoing lens distortion correction and geometric alignment to produce projections in a common coordinate space and stitching to synthesize the desired view using these projections. The lens distortion correction and geometric alignment is typically accomplished by processing the images on a block-by-block basis, with predetermined block dimensions (e.g., 32×32 pixels). After this geometric transformation and perhaps some block-based filtering operations (e.g., sharpening and temporal filtering), the images may be stored in memory 408 for subsequent stitching to combine the images from multiple cameras to a single image. This image may be subject to scaling and conversion to produce one or more desired output formats and image resolutions, for instance, for display, storage, computer vision engine, etc.

In various embodiments, stitched images may be directly displayed, without the need to leave the system agent 410, which includes both the IPU 406 and the display engine 412. This may reduce power consumption since the graphics engine (which may include 3D and media blocks) may remain powered off. When the coordinate transformation is completely handled inside the IPU 410 with combined lens and geometric distortion correction and geometric alignment capabilities, the image data undergoes resampling only once, which provides image quality benefits. Moreover, avoiding the use of the GPU in this process saves power and improves latency.

Figure 5:
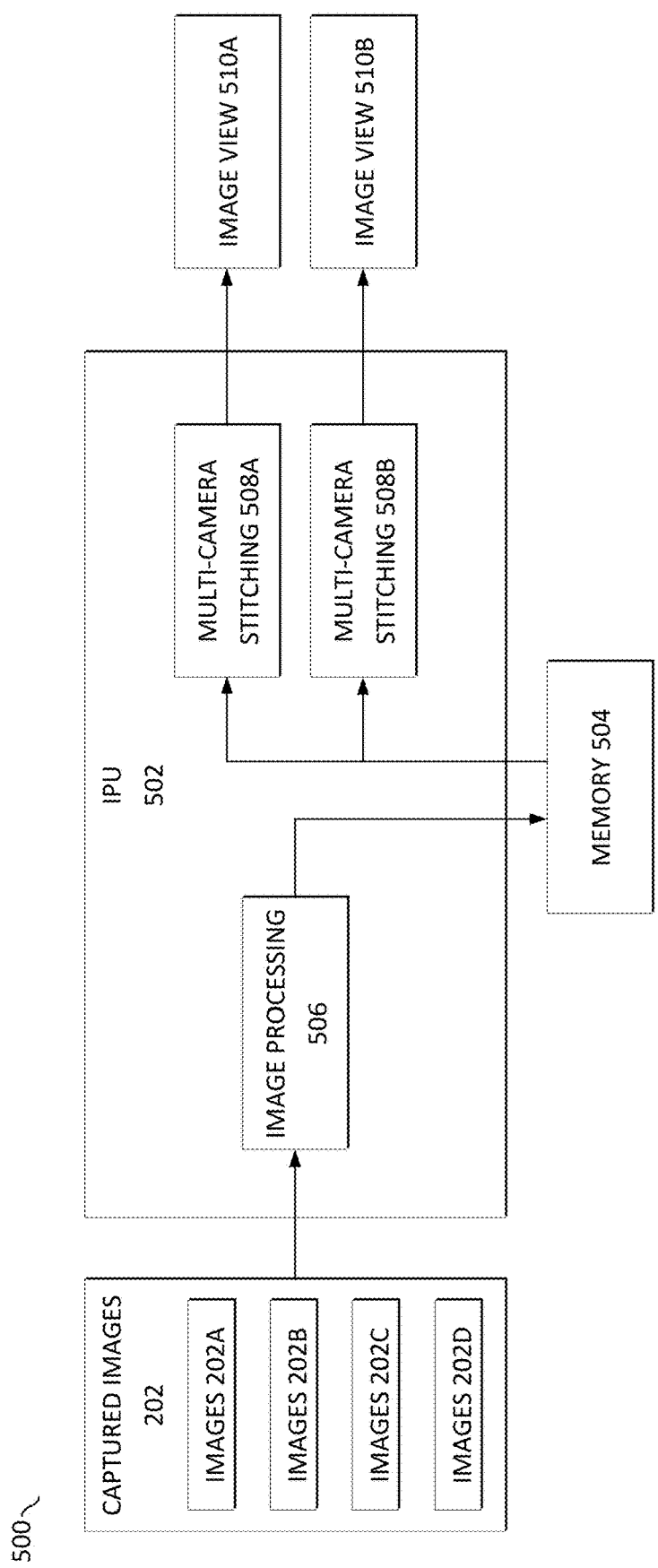
FIG. 5 illustrates a system comprising multiple stitching modules of an image processing unit (IPU) in accordance with certain embodiments.

FIG. 5 illustrates an architecture 500 comprising multiple multi-camera stitching modules 508 (e.g., 508A and 508B) of an image processing unit IPU 502 in accordance with certain embodiments. The multiple modules 508 may enable parallel generation of multiple different views (e.g., a side view and a surround view).

In a particular embodiment, the IPU 502 includes an image processing module 506 to perform lens and geometric distortion correction (including geometric alignment). The resulting data may then be stored in memory 504. In one embodiment, memory 504 may be a full-resolution DDR buffer dedicated to the storage of the processed image data. Each of the multi-camera stitching modules 508 may include circuitry for stitching (including blending and photometric alignment) and postprocessing (including rendering) the image data from memory 504.

Implementing the stitching functionality solely on the IPU 502 may lead to some image quality compromises due to memory access (data read/write operations) and processing limitations. For instance, the stitching process may be simplified to keep it feasible for hardware implementation on the IPU.

Based on block location within the stitched image, blocks from one or more cameras may be read in and written out to perform blending and/or photometric alignment. The stitching process may be optimized differently for different projections and views. For example, for a bird's eye view, images from side cameras (e.g., 102B and 102D) may be assigned to the stitched image first without processing the data (e.g., without adjusting the color or brightness values of the pixels of these images) in the stitching block. The images captured by front and rear cameras (e.g., 102A and 102C) may then be read from memory 504 and processed for blending and photometric correction before being assigned to the stitched image.

In another example, the non-overlapping portions from the side cameras (e.g., 102B and 102D) can be directly assigned to the stitched image, while the overlapping portions of the stitched image are adjusted with the stitching parameters and assigned to the output image. Non-overlapping portions from the front and rear cameras (e.g., 102A and 102C) may also be directly assigned to the output image, while overlapping portions are adjusted with the stitching parameters and then combined with the adjusted overlapping portions from the side cameras that are already assigned to the stitched image (thus the overlapping regions from front and rear cameras are combined with the data in the stitched image from the overlapping regions from the side cameras). In yet another example, non-overlapping portions from any camera may also be adjusted prior to assigning the data to the output image.

Figure 6:
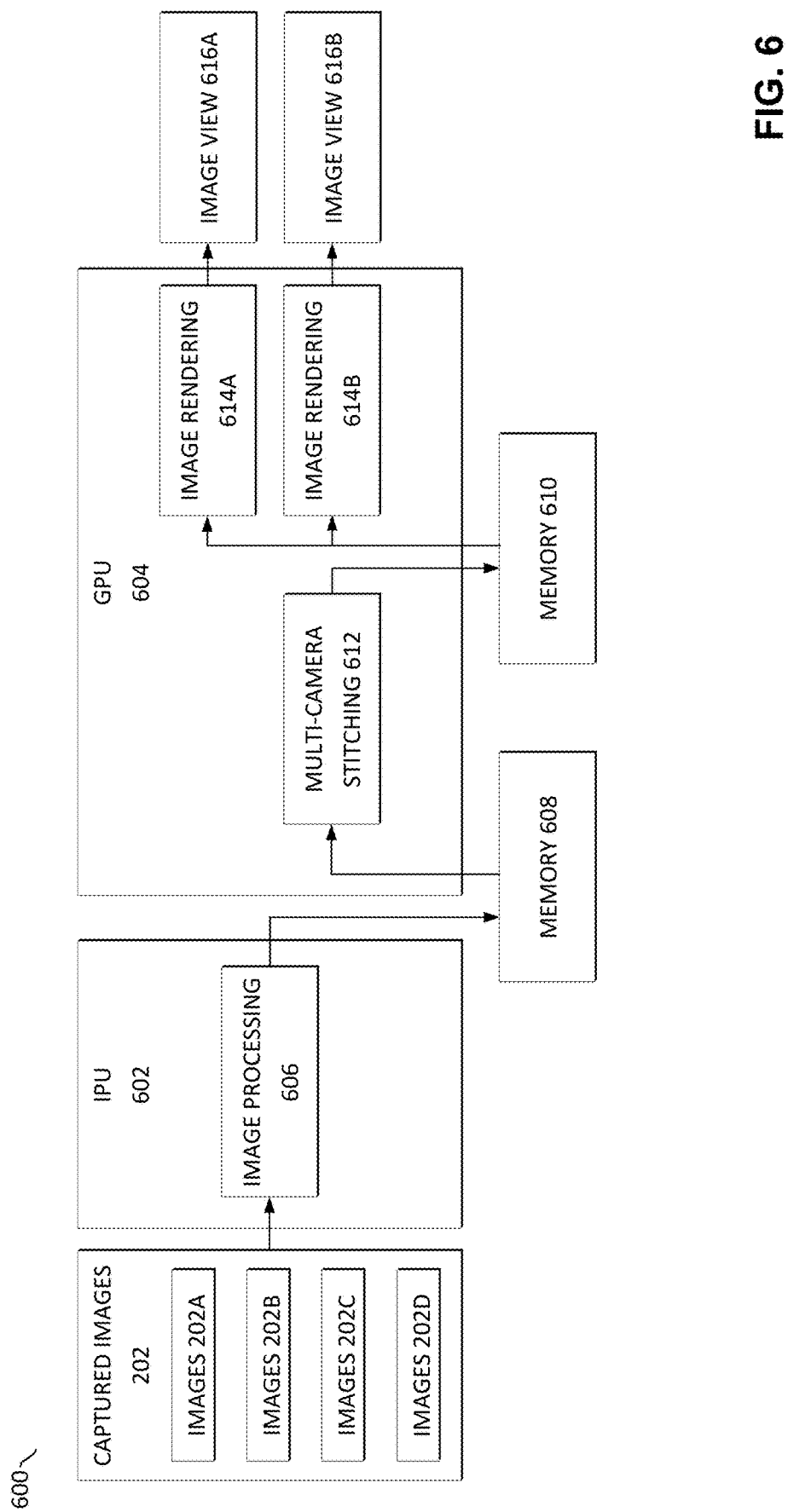
FIG. 6 illustrates a system comprising an IPU and a graphics processing unit (GPU) to generate multiple stitched images in accordance with certain embodiments.

FIG. 6 illustrates an architecture comprising an IPU 602 and a GPU 604 to generate multiple stitched images in accordance with certain embodiments. In this embodiment, lens and geometric distortion correction (including geometric alignment) may be performed by an image processing module 606 of the IPU 602 and the results are stored in memory 608, while multicamera stitching (including blending and photometric alignment) and rendering is entirely handled in the GPU 604. For example, multi-camera stitching module 612 may perform the multicamera stitching, and image rendering modules 614A and 614B may each render a view (image views 616A and 616B) based on the output of the multi-camera stitching module 612 stored in memory 610. Memory 610 may be the same memory as 608 or may be a separate memory. Either memory may be a system memory comprising DDR or other type of memory or a memory dedicated to storing image data.

While multiple read and writes to the memories 608 and 610 may affect performance and power consumption, this approach has the flexibility to enable more complex implementations of the proposed stitching methods (resulting in better image quality) and any number of views by adding various GPU render stages. Stitching the images on the GPU 604 may result in the graphics engine (e.g., 414) being powered on during the stitching operation and powered off during the rest of the frame time, thus potentially incurring higher latency and power due to GPU utilization.

In some embodiments, the depicted implementation may also affect the quality of the images due to multiple resampling processes employed during rendering from the base stitched image stored in memory 610. To mitigate this problem, in some embodiments, some of the image rendering processes may include scaling and conversion operations and exclude resampling for view generation.

Figure 7:
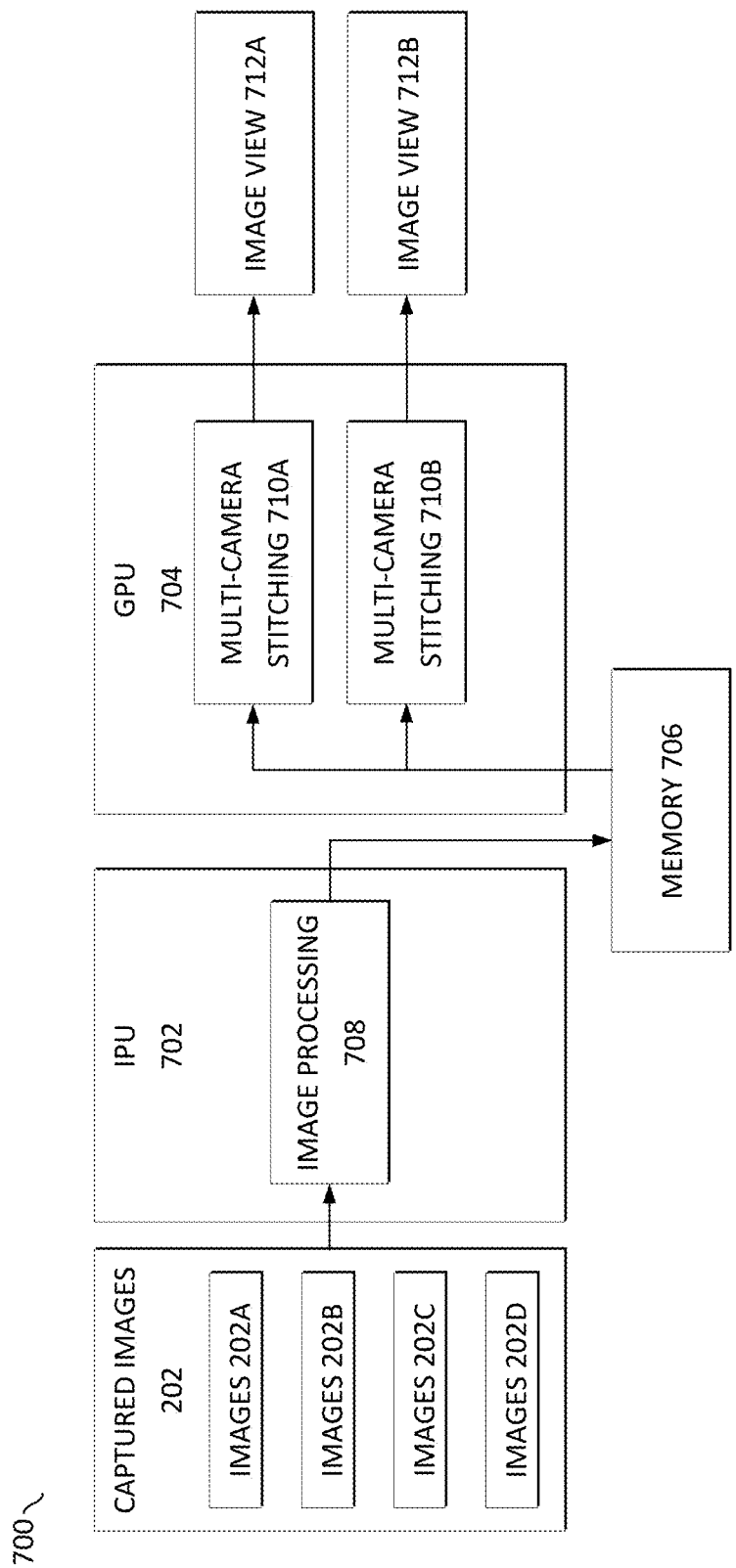
FIG. 7 illustrates a system comprising an IPU and a GPU with multiple multi-camera stitching modules to generate multiple stitched images in accordance with certain embodiments.

FIG. 7 illustrates an architecture comprising an IPU 702, GPU 704, and dedicated memory 706 to generate multiple stitched image views 712A and 712B in accordance with certain embodiments. In such an embodiment, the processing steps for the surround camera system, such as lens and geometric distortion correction (including geometric alignment), stitching (including blending and photometric alignment), and final image rendering may be performed by the multi-camera stitching modules 710A and 710B and entirely handled in the GPU (while other image preprocessing may be performed by image processing module 708 of the IPU 702). Such an implementation may increase power consumption and latency relative to the implementation described in FIG. 5, but offer similar or improved flexibility and processing quality (this architecture permits more complex versions of the stitching method) relative to the architecture of FIG. 5. The architecture of FIG. 7 may also avoid image quality degradations due to repetitive resampling, which may occur (for at least some views) in the architecture shown in FIG. 6.

In addition to the architectures described herein, other implementations are contemplated herein. For instance, the number of cameras used may change with the vehicle size (in general, images from any number of cameras having any number of overlapping regions may be stitched together according to the techniques described herein). Similarly, the number and nature of views to be generated may be varied depending on use cases, such as assisting the driver (views and/or viewpoints determined by the driver vs. automated decision making based on driving mode and situations, analytics, driver's head pose, etc.), recording views for insurance purposes, using images for computer vision or AR/VR-based entertainment, etc.

In some embodiments, (e.g., based on the use case, computational, and image quality requirements), a multi-camera stitching module (e.g., 206, 508, 612, 710) may be split into two or more sub-modules. Thus, instead of creating multiple instance of the whole module in order to generate multiple views, the intermediate output from some of the previous sub-modules may be shared as the input for multiple instances of subsequent sub-modules. In some embodiments, different sub-modules may have different parameter configuration or may apply different processing operations.

Figure 8:
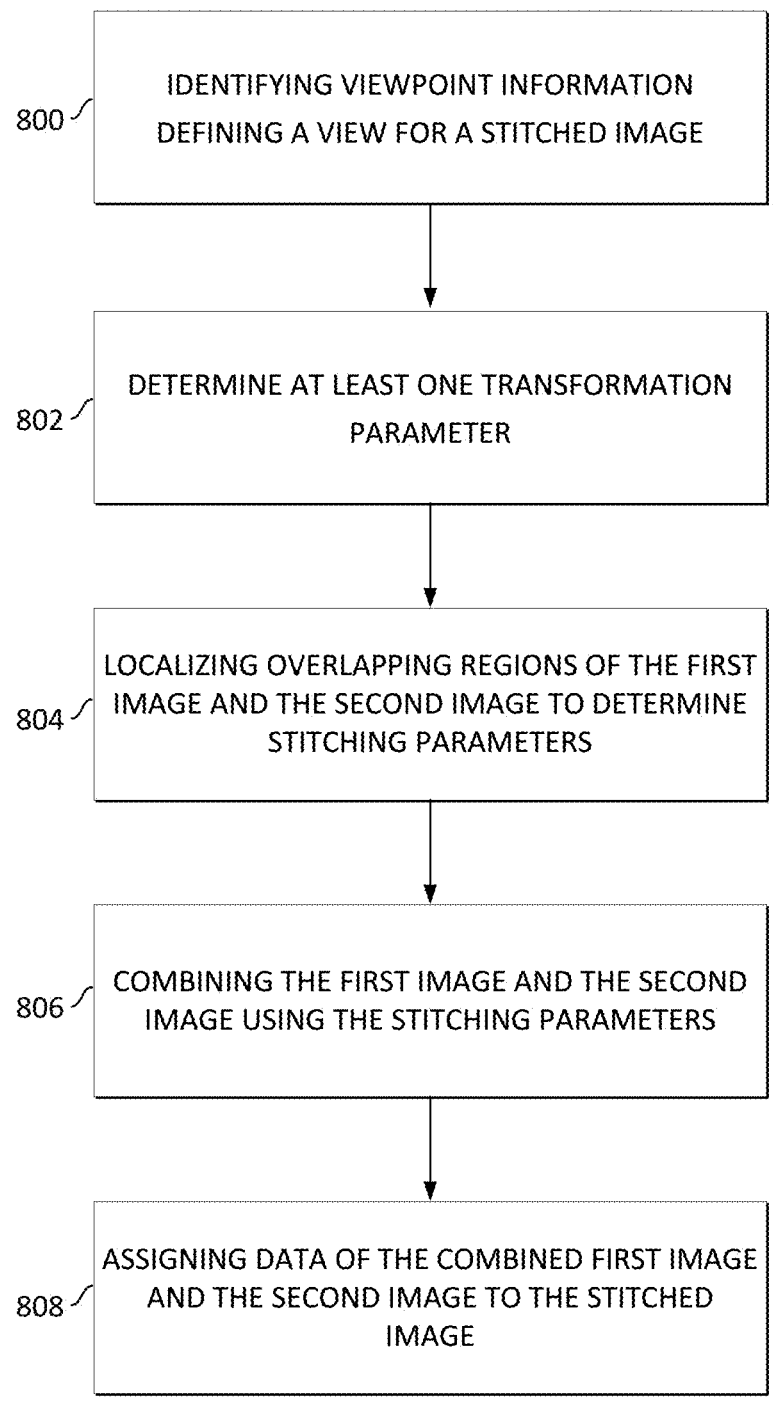
FIG. 8 illustrates a flow for assigning data of combined images to a stitched image in accordance with certain embodiments.

FIG. 8 illustrates a flow for assigning combined data to a stitched image in accordance with certain embodiments. The flow may be executed by a processor or other suitable computing logic. At 800 viewpoint information defining a view for a stitched image is identified. At 802, at least one transformation parameter is determined for at least one reference region (e.g., based on the viewpoint information and a projection type). At 804, overlapping regions of a first image and a second image are localized to determine stitching parameters. At 806, the first image and the second image may be combined using the stitching parameters. At 808, data of the combined first image and the second image may be assigned to the stitched image. In various embodiments 804, 806, and 808 may be performed based on the viewpoint information and a projection type.

FIGS. 9-14 illustrate example environments in which various aspects of the present disclosure may operate or various components that may be used to perform operations described herein. For example, any of the modules (e.g., 204, 206, 208, 210, 506, 508, 606, 612, 614, 708, 710), IPUs, GPUs, or other suitable components may be implemented by a processor, such as in-vehicle processing system 1010, processor 1300, or other suitable combination of circuitry (which in some cases may include a computer readable medium with instructions for execution of various operations described herein). In various embodiments, any one or more operations described herein may be performed in-vehicle or by one or more servers coupled to a vehicle (various processing environments are described in more detail below).

Figure 9:
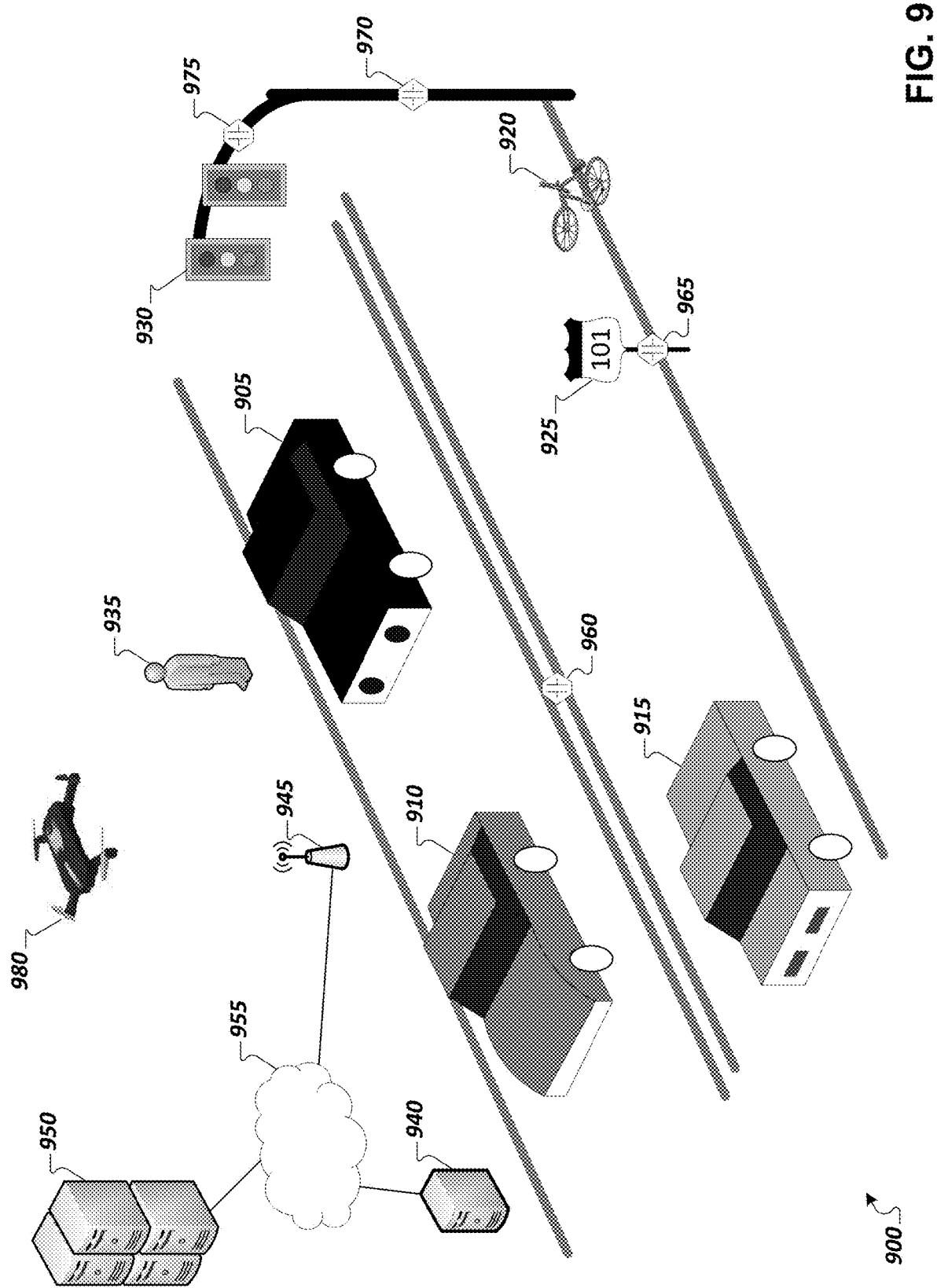
FIG. 9 is a simplified illustration showing an example autonomous driving environment in accordance with certain embodiments.

FIG. 9 is a simplified illustration 900 showing an example autonomous driving environment. Vehicles (e.g., 905, 910, 915, etc.) may be provided with varying levels of autonomous driving capabilities facilitated through in-vehicle computing systems with logic implemented in hardware, firmware, and/or software to enable respective autonomous driving stacks. Such autonomous driving stacks may allow vehicles to self-control or provide driver assistance to detect roadways, navigate from one point to another, detect other vehicles and road actors (e.g., pedestrians (e.g., 935), bicyclists, etc.), detect obstacles and hazards (e.g., 920), and road conditions (e.g., traffic, road conditions, weather conditions, etc.), and adjust control and guidance of the vehicle accordingly.

In some implementations, vehicles (e.g., 905, 910, 915) within the environment may be "connected" in that the in-vehicle computing systems include communication modules to support wireless communication using one or more technologies (e.g., Institute of Electrical and Electronics Engineers (IEEE) 802.11 communications (e.g., WiFi), cellular data networks (e.g., 3rd Generation Partnership Project (3GPP) networks, Global System for Mobile Communication (GSM), general packet radio service, code division multiple access (CDMA), etc.), Bluetooth, millimeter wave (mmWave), ZigBee, Z-Wave, etc.), allowing the in-vehicle computing systems to connect to and communicate with other computing systems, such as the in-vehicle computing systems of other vehicles or supporting infrastructure. For instance, in some implementations, vehicles (e.g., 905, 910, 915) may communicate with computing systems providing sensors, data, and services in support of the vehicles' autonomous driving capabilities. For instance, as shown in the illustrative example of FIG. 9, supporting drones 980 (e.g., ground-based and/or aerial), roadside computing devices (e.g., 940), various external (to the vehicle, or "extraneous") sensor devices (e.g., 960, 965, 970, 975, etc.), and other devices may be provided as autonomous driving infrastructure separate from the computing systems, sensors, and logic implemented on the vehicles (e.g., 905, 910, 915) to support and improve autonomous driving results provided through the vehicles, among other examples. Vehicles may also communicate with other connected vehicles over wireless communication channels to share data and coordinate movement within an autonomous driving environment, among other example communications.

As illustrated in the example of FIG. 9, autonomous driving infrastructure may incorporate a variety of different systems. Such systems may vary depending on the location, with more developed roadways (e.g., roadways controlled by specific municipalities or toll authorities, roadways in urban areas, sections of roadways known to be problematic for autonomous vehicles, etc.) having a greater number or more advanced supporting infrastructure devices than other sections of roadway, etc. For instance, supplemental sensor devices (e.g., 960, 965, 970, 975) may be provided, which include sensors for observing portions of roadways and vehicles moving within the environment and generating corresponding data describing or embodying the observations of the sensors. As examples, sensor devices may be embedded within the roadway itself (e.g., sensor 960), on roadside or overhead signage (e.g., sensor 965 on sign 925), sensors (e.g., 970, 975) attached to electronic roadside equipment or fixtures (e.g., traffic lights (e.g., 930), electronic road signs, electronic billboards, etc.), dedicated road side units (e.g., 940), among other examples. Sensor devices may also include communication capabilities to communicate their collected sensor data directly to nearby connected vehicles or to fog- or cloud-based computing systems (e.g., 940, 950). Vehicles may obtain sensor data collected by external sensor devices (e.g., 960, 965, 970, 975, 980), or data embodying observations or recommendations generated by other systems (e.g., 940, 950) based on sensor data from these sensor devices (e.g., 960, 965, 970, 975, 980), and use this data in sensor fusion, inference, path planning, and other tasks performed by the in-vehicle autonomous driving system. In some cases, such extraneous sensors and sensor data may, in actuality, be within the vehicle, such as in the form of an after-market sensor attached to the vehicle, a personal computing device (e.g., smartphone, wearable, etc.) carried or worn by passengers of the vehicle, etc. Other road actors, including pedestrians, bicycles, drones, electronic scooters, etc., may also be provided with or carry sensors to generate sensor data describing an autonomous driving environment, which may be used and consumed by autonomous vehicles, cloud- or fog-based support systems (e.g., 940, 950), other sensor devices (e.g., 960, 965, 970, 975, 980), among other examples.

As autonomous vehicle systems may possess varying levels of functionality and sophistication, support infrastructure may be called upon to supplement not only the sensing capabilities of some vehicles, but also the computer and machine learning functionality enabling autonomous driving functionality of some vehicles. For instance, compute resources and autonomous driving logic used to facilitate machine learning model training and use of such machine learning models may be provided on the in-vehicle computing systems entirely or partially on both the in-vehicle systems and some external systems (e.g., 940, 950). For instance, a connected vehicle may communicate with roadside units, edge systems, or cloud-based devices (e.g., 940) local to a particular segment of roadway, with such devices (e.g., 940) capable of providing data (e.g., sensor data aggregated from local sensors (e.g., 960, 965, 970, 975, 980) or data reported from sensors of other vehicles), performing computations (as a service) on data provided by a vehicle to supplement the capabilities native to the vehicle, and/or push information to passing or approaching vehicles (e.g., based on sensor data collected at the device 940 or from nearby sensor devices, etc.). A connected vehicle (e.g., 905, 910, 915) may also or instead communicate with cloud-based computing systems (e.g., 950), which may provide similar memory, sensing, and computational resources to enhance those available at the vehicle. For instance, a cloud-based system (e.g., 950) may collect sensor data from a variety of devices in one or more locations and utilize this data to build and/or train machine-learning models which may be used at the cloud-based system (to provide results to various vehicles (e.g., 905, 910, 915) in communication with the cloud-based system 950, or to push to vehicles for use by their in-vehicle systems, among other example implementations. Access points (e.g., 945), such as cell-phone towers, road-side units, network access points mounted to various roadway infrastructure, access points provided by neighboring vehicles or buildings, and other access points, may be provided within an environment and used to facilitate communication over one or more local or wide area networks (e.g., 955) between cloud-based systems (e.g., 950) and various vehicles (e.g., 905, 910, 915). Through such infrastructure and computing systems, it should be appreciated that the examples, features, and solutions discussed herein may be performed entirely by one or more of such in-vehicle computing systems, fog-based or edge computing devices, or cloud-based computing systems, or by combinations of the foregoing through communication and cooperation between the systems.

In general, "servers," "clients," "computing devices," "network elements," "hosts," "platforms", "sensor devices," "edge device," "autonomous driving systems", "autonomous vehicles", "fog-based system", "cloud-based system", and "systems" generally, etc. discussed herein can include electronic computing devices operable to receive, transmit, process, store, or manage data and information associated with an autonomous driving environment. As used in this document, the term "computer," "processor," "processor device," or "processing device" is intended to encompass any suitable processing apparatus, including central processing units (CPUs), graphical processing units (GPUs), application specific integrated circuits (ASICs), field programmable gate arrays (FPGAs), digital signal processors (DSPs), tensor processors and other matrix arithmetic processors, among other examples. For example, elements shown as single devices within the environment may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Any of the flows, methods, processes (or portions thereof) or functionality of any of the various components described herein or illustrated in the FIGs. may be performed by any suitable computing logic, such as one or more modules, engines, blocks, units, models, systems, or other suitable computing logic. Reference herein to a "module", "engine", "block", "unit", "model", "system" or "logic" may refer to hardware, firmware, software and/or combinations of each to perform one or more functions. As an example, a module, engine, block, unit, model, system, or logic may include one or more hardware components, such as a micro-controller or processor, associated with a non-transitory medium to store code adapted to be executed by the micro-controller or processor. Therefore, reference to a module, engine, block, unit, model, system, or logic, in one embodiment, may refers to hardware, which is specifically configured to recognize and/or execute the code to be held on a non-transitory medium. Furthermore, in another embodiment, use of module, engine, block, unit, model, system, or logic refers to the non-transitory medium including the code, which is specifically adapted to be executed by the microcontroller or processor to perform predetermined operations. And as can be inferred, in yet another embodiment, a module, engine, block, unit, model, system, or logic may refer to the combination of the hardware and the non-transitory medium. In various embodiments, a module, engine, block, unit, model, system, or logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. A module, engine, block, unit, model, system, or logic may include one or more gates or other circuit components, which may be implemented by, e.g., transistors. In some embodiments, a module, engine, block, unit, model, system, or logic may be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Furthermore, logic boundaries that are illustrated as separate commonly vary and potentially overlap. For example, a first and second module (or multiple engines, blocks, units, models, systems, or logics) may share hardware, software, firmware, or a combination thereof, while potentially retaining some independent hardware, software, or firmware.

With reference now to FIG. 10, a simplified block diagram 1000 is shown illustrating an example implementation of a vehicle (and corresponding in-vehicle computing system) 905 equipped with autonomous driving functionality. In one example, a vehicle 905 may be equipped with one or more processors 1002, such as central processing units (CPUs), graphical processing units (GPUs), application specific integrated circuits (ASICs), field programmable gate arrays (FPGAs), digital signal processors (DSPs), tensor processors and other matrix arithmetic processors, among other examples. Such processors 1002 may be coupled to or have integrated hardware accelerator devices (e.g., 1004), which may be provided with hardware to accelerate certain processing and memory access functions, such as functions relating to machine learning inference or training, processing of particular sensor data (e.g., camera image data, LIDAR point clouds, etc.), performing certain arithmetic functions pertaining to autonomous driving (e.g., matrix arithmetic, convolutional arithmetic, etc.), among other examples. One or more memory elements (e.g., 1006) may be provided to store machine-executable instructions implementing all or a portion of any one of the modules or sub-modules of an autonomous driving stack implemented on the vehicle, as well as storing machine learning models (e.g., 1056), sensor data (e.g., 1058), and other data received, generated, or used in connection with autonomous driving functionality to be performed by the vehicle (or used in connection with the examples and solutions discussed herein). Various communication modules (e.g., 1012) may also be provided, implemented in hardware circuitry and/or software to implement communication capabilities used by the vehicle's system to communicate with other extraneous computing systems over one or more network channels employing one or more network communication technologies. These various processors 1002, accelerators 1004, memory devices 1006, and network communication modules 1012, may be interconnected on the vehicle system through one or more interconnect fabrics or links (e.g., 1008), such as fabrics utilizing technologies such as a Peripheral Component Interconnect Express (PCIe), Ethernet, OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centrig™ interconnect, among others.

Continuing with the example of FIG. 10, an example vehicle (and corresponding in-vehicle computing system) 905 may include an in-vehicle processing system 1010, driving controls (e.g., 1020), sensors (e.g., 1025), and user/passenger interface(s) (e.g., 1030), among other example modules implemented functionality of the autonomous vehicle in hardware and/or software. For instance, an in-vehicle processing system 1010, in some implementations, may implement all or a portion of an autonomous driving stack and process flow (e.g., as shown and discussed in the example of FIG. 5). A machine learning engine 1032 may be provided to utilize various machine learning models (e.g., 1056) provided at the vehicle 905 in connection with one or more autonomous functions and features provided and implemented at or for the vehicle, such as discussed in the examples herein. Such machine learning models 1056 may include artificial neural network models, convolutional neural networks, decision tree-based models, support vector machines (SVMs), Bayesian models, deep learning models, and other example models. In some implementations, an example machine learning engine 1032 may include one or more model trainer engines 1052 to participate in training (e.g., initial training, continuous training, etc.) of one or more of the machine learning models 1056. One or more inference engines 1054 may also be provided to utilize the trained machine learning models 1056 to derive various inferences, predictions, classifications, and other results.

The machine learning engine(s) 1032 provided at the vehicle may be utilized to support and provide results for use by other logical components and modules of the in-vehicle processing system 1010 implementing an autonomous driving stack and other autonomous-driving-related features. For instance, a data collection module 1034 may be provided with logic to determine sources from which data is to be collected (e.g., for inputs in the training or use of various machine learning models 1056 used by the vehicle). For instance, the particular source (e.g., internal sensors (e.g., 1025) or extraneous sources (e.g., 915, 940, 950, 980, 1015, etc.)) may be selected, as well as the frequency and fidelity at which the data is sampled is selected. In some cases, such selections and configurations may be made at least partially autonomously by the data collection module 1034 using one or more corresponding machine learning models (e.g., to collect data as appropriate given a particular detected scenario).

A sensor fusion module 1036 may also be used to govern the use and processing of the various sensor inputs utilized by the machine learning engine 1032 and other modules (e.g., 1038, 1040, 1042, 1044, 1046, etc.) of the in-vehicle processing system. One or more sensor fusion modules (e.g., 1036) may be provided, which may derive an output from multiple sensor data sources (e.g., on the vehicle or extraneous to the vehicle). The sources may be homogenous or heterogeneous types of sources (e.g., multiple inputs from multiple instances of a common type of sensor, or from instances of multiple different types of sensors). An example sensor fusion module 1036 may apply direct fusion, indirect fusion, among other example sensor fusion techniques. The output of the sensor fusion may, in some cases by fed as an input (along with potentially additional inputs) to another module of the in-vehicle processing system and/or one or more machine learning models in connection with providing autonomous driving functionality or other functionality, such as described in the example solutions discussed herein.

A perception engine 1038 may be provided in some examples, which may take as inputs various sensor data (e.g., 1058) including data, in some instances, from extraneous sources and/or sensor fusion module 1036 to perform object recognition and/or tracking of detected objects, among other example functions corresponding to autonomous perception of the environment encountered (or to be encountered) by the vehicle 905. Perception engine 1038 may perform object recognition from sensor data inputs using deep learning, such as through one or more convolutional neural networks and other machine learning models 1056. Object tracking may also be performed to autonomously estimate, from sensor data inputs, whether an object is moving and, if so, along what trajectory. For instance, after a given object is recognized, a perception engine 1038 may detect how the given object moves in relation to the vehicle. Such functionality may be used, for instance, to detect objects, such as other vehicles, pedestrians, wildlife, cyclists, etc. moving within an environment, which may affect the path of the vehicle on a roadway, among other example uses.

A localization engine 1040 may also be included within an in-vehicle processing system 1010 in some implementation. In some cases, localization engine 1040 may be implemented as a sub-component of a perception engine 1038. The localization engine 1040 may also make use of one or more machine learning models 1056 and sensor fusion (e.g., of LIDAR and GPS data, etc.) to determine a high confidence location of the vehicle and the space it occupies within a given physical space (or "environment").

A vehicle 905 may further include a path planner 1042, which may make use of the results of various other modules, such as data collection (e.g., 1034), sensor fusion (e.g., 1036), perception engine (e.g., 1038,) and localization engine (e.g., 1040) among others (e.g., recommendation engine 1044) to determine a path plan and/or action plan for the vehicle, which may be used by drive controls (e.g., 1020) to control the driving of the vehicle 905 within an environment. For instance, a path planner 1042 may utilize these inputs and one or more machine learning models to determine probabilities of various events within a driving environment to determine effective real-time plans to act within the environment.

In some implementations, the vehicle 905 may include one or more recommendation engines 1044 to generate various recommendations from sensor data generated by the vehicle's 905 own sensors (e.g., 1025) as well as sensor data from extraneous sensors (e.g., sensor devices 915, 980, 1015, etc.). Some recommendations may be determined by the recommendation engine 1044, which may be provided as inputs to other components of the vehicle's autonomous driving stack to influence determinations that are made by these components. For instance, a recommendation may be determined, which, when considered by a path planner 1042, causes the path planner 1042 to deviate from decisions or plans it would ordinarily otherwise determine, but for the recommendation. Recommendations may also be generated by recommendation engines (e.g., 1044) based on considerations of passenger comfort and experience. In some cases, interior features within the vehicle may be manipulated predictively and autonomously based on these recommendations (which are determined from sensor data (e.g., 1058) captured by the vehicle's sensors and/or extraneous sensors, etc.

As introduced above, some vehicle implementations may include user/passenger experience engines (e.g., 1046), which may utilize sensor data and outputs of other modules within the vehicle's autonomous driving stack to cause driving maneuvers and changes to the vehicle's cabin environment to enhance the experience of passengers within the vehicle based on the observations captured by the sensor data (e.g., 1058). In some instances, aspects of user interfaces (e.g., 1030) provided on the vehicle to enable users to interact with the vehicle and its autonomous driving system may be enhanced. In some cases, informational presentations may be generated and provided through user displays (e.g., audio, visual, and/or tactile presentations) to help affect and improve passenger experiences within a vehicle (e.g., 905) among other example uses.

In some cases, a system manager 1050 may also be provided, which monitors information collected by various sensors on the vehicle to detect issues relating to the performance of a vehicle's autonomous driving system. For instance, computational errors, sensor outages and issues, availability and quality of communication channels (e.g., provided through communication modules 1012), vehicle system checks (e.g., issues relating to the motor, transmission, battery, cooling system, electrical system, tires, etc.), or other operational events may be detected by the system manager 1050. Such issues may be identified in system report data generated by the system manager 1050, which may be utilized, in some cases, as inputs to machine learning models 1056 and related autonomous driving modules (e.g., 1032, 1034, 1036, 1038, 1040, 1042, 1044, 1046, etc.) to enable vehicle system health and issues to also be considered along with other information collected in sensor data 1058 in the autonomous driving functionality of the vehicle 905.

In some implementations, an autonomous driving stack of a vehicle 905 may be coupled with drive controls 1020 to affect how the vehicle is driven, including steering controls (e.g., 1060), accelerator/throttle controls (e.g., 1062), braking controls (e.g., 1064), signaling controls (e.g., 1066), among other examples. In some cases, a vehicle may also be controlled wholly or partially based on user inputs. For instance, user interfaces (e.g., 1030), may include driving controls (e.g., a physical or virtual steering wheel, accelerator, brakes, clutch, etc.) to allow a human driver to take control from the autonomous driving system (e.g., in a handover or following a driver assist action). Other sensors may be utilized to accept user/passenger inputs, such as speech detection 1092, gesture detection cameras 1094, and other examples. User interfaces (e.g., 1030) may capture the desires and intentions of the passenger-users and the autonomous driving stack of the vehicle 905 may consider these as additional inputs in controlling the driving of the vehicle (e.g., drive controls 1020). In some implementations, drive controls may be governed by external computing systems, such as in cases where a passenger utilizes an external device (e.g., a smartphone or tablet) to provide driving direction or control, or in cases of a remote valet service, where an external driver or system takes over control of the vehicle (e.g., based on an emergency event), among other example implementations.

As discussed above, the autonomous driving stack of a vehicle may utilize a variety of sensor data (e.g., 1058) generated by various sensors provided on and external to the vehicle. As an example, a vehicle 905 may possess an array of sensors 1025 to collect various information relating to the exterior of the vehicle and the surrounding environment, vehicle system status, conditions within the vehicle, and other information usable by the modules of the vehicle's processing system 1010. For instance, such sensors 1025 may include global positioning (GPS) sensors 1068, light detection and ranging (LIDAR) sensors 1070, two-dimensional (2D) cameras 1072, three-dimensional (3D) or stereo cameras 1074, acoustic sensors 1076, inertial measurement unit (IMU) sensors 1078, thermal sensors 1080, ultrasound sensors 1082, bio sensors 1084 (e.g., facial recognition, voice recognition, heart rate sensors, body temperature sensors, emotion detection sensors, etc.), radar sensors 1086, weather sensors (not shown), among other example sensors. Sensor data 1058 may also (or instead) be generated by sensors that are not integrally coupled to the vehicle, including sensors on other vehicles (e.g., 915) (which may be communicated to the vehicle 905 through vehicle-to-vehicle communications or other techniques), sensors on ground-based or aerial drones 980, sensors of user devices 1015 (e.g., a smartphone or wearable) carried by human users inside or outside the vehicle 905, and sensors mounted or provided with other roadside elements, such as a roadside unit (e.g., 940), road sign, traffic light, streetlight, etc. Sensor data from such extraneous sensor devices may be provided directly from the sensor devices to the vehicle or may be provided through data aggregation devices or as results generated based on these sensors by other computing systems (e.g., 940, 950), among other example implementations.

In some implementations, an autonomous vehicle system 905 may interface with and leverage information and services provided by other computing systems to enhance, enable, or otherwise support the autonomous driving functionality of the device 905. In some instances, some autonomous driving features (including some of the example solutions discussed herein) may be enabled through services, computing logic, machine learning models, data, or other resources of computing systems external to a vehicle. When such external systems are unavailable to a vehicle, it may be that these features are at least temporarily disabled. For instance, external computing systems may be provided and leveraged, which are hosted in road-side units or fog-based edge devices (e.g., 940), other (e.g., higher-level) vehicles (e.g., 915), and cloud-based systems 950 (e.g., accessible through various network access points (e.g., 945)). A roadside unit 940 or cloud-based system 950 (or other cooperating system, with which a vehicle (e.g., 905) interacts may include all or a portion of the logic illustrated as belonging to an example in-vehicle processing system (e.g., 1010), along with potentially additional functionality and logic. For instance, a cloud-based computing system, road side unit 940, or other computing system may include a machine learning engine supporting either or both model training and inference engine logic. For instance, such external systems may possess higher-end computing resources and more developed or up-to-date machine learning models, allowing these services to provide superior results to what would be generated natively on a vehicle's processing system 1010. For instance, an in-vehicle processing system 1010 may rely on the machine learning training, machine learning inference, and/or machine learning models provided through a cloud-based service for certain tasks and handling certain scenarios. Indeed, it should be appreciated that one or more of the modules discussed and illustrated as belonging to vehicle 905 may, in some implementations, be alternatively or redundantly provided within a cloud-based, fog-based, or other computing system supporting an autonomous driving environment.

Various embodiments herein may utilize one or more machine learning models to perform functions of the AV stack (or other functions described herein). A machine learning model may be executed by a computing system to progressively improve performance of a specific task. In some embodiments, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various embodiments described herein may utilize one or more classification models. In a classification model, the outputs may be restricted to a limited set of values. The classification model may output a class for an input set of one or more input values. References herein to classification models may contemplate a model that implements, e.g., any one or more of the following techniques: linear classifiers (e.g., logistic regression or naïve Bayes classifier), support vector machines, decision trees, boosted trees, random forest, neural networks, or nearest neighbor.

Various embodiments described herein may utilize one or more regression models. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

Figure 11:
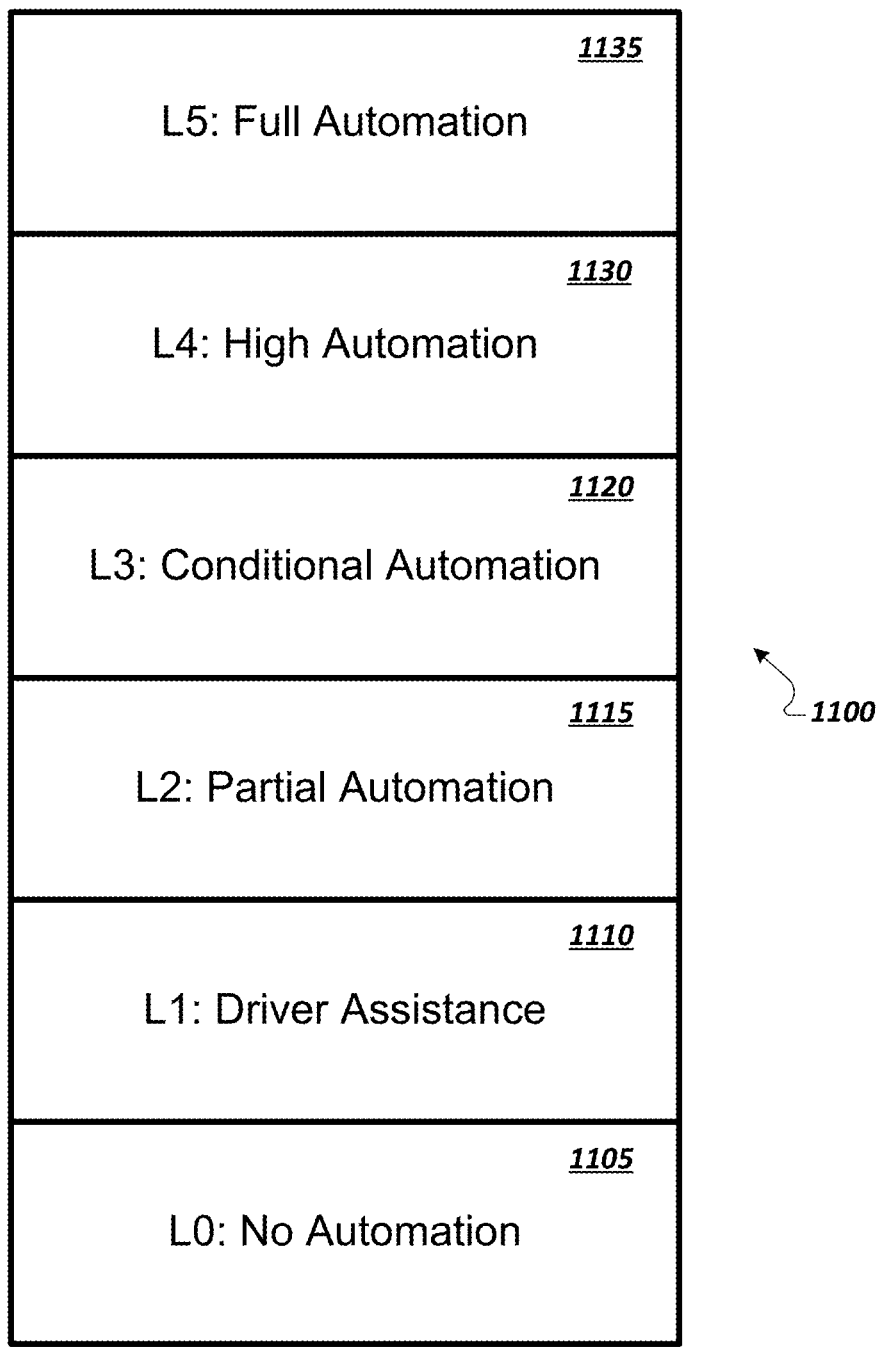
FIG. 11 is a simplified block diagram illustrating example levels of autonomous driving which may be supported in various vehicles (e.g., by their corresponding in-vehicle computing systems) in accordance with certain embodiments.

Turning to FIG. 11, a simplified block diagram 1100 is shown illustrating example levels of autonomous driving, which may be supported in various vehicles (e.g., by their corresponding in-vehicle computing systems). For instance, a range of levels may be defined (e.g., L0-L5 (1105-1135)), with level 5 (L5) corresponding to vehicles with the highest level of autonomous driving functionality (e.g., full automation), and level 0 (L0) corresponding the lowest level of autonomous driving functionality (e.g., no automation). For instance, an L5 vehicle (e.g., 1135) may possess a fully-autonomous computing system capable of providing autonomous driving performance in every driving scenario equal to or better than would be provided by a human driver, including in extreme road conditions and weather. An L4 vehicle (e.g., 1130) may also be considered fully-autonomous capable of performing safety-critical driving functions and effectively monitoring roadway conditions throughout an entire trip from a starting location to a destination. L4 vehicles may differ from L5 vehicles, in that an L4's autonomous capabilities are defined within the limits of the vehicle's "operational design domain," which may not include all driving scenarios. L3 vehicles (e.g., 1120) provide autonomous driving functionality to completely shift safety-critical functions to the vehicle in a set of specific traffic and environment conditions, but which still expect the engagement and availability of human drivers to handle driving in all other scenarios. Accordingly, L3 vehicles may provide handover protocols to orchestrate the transfer of control from a human driver to the autonomous driving stack and back. L2 vehicles (e.g., 1115) provide driver assistance functionality, which allow the driver to occasionally disengage from physically operating the vehicle, such that both the hands and feet of the driver may disengage periodically from the physical controls of the vehicle. L1 vehicles (e.g., 1110) provide driver assistance of one or more specific functions (e.g., steering, braking, etc.), but still require constant driver control of most functions of the vehicle. L0 vehicles may be considered not autonomous—the human driver controls all of the driving functionality of the vehicle (although such vehicles may nonetheless participate passively within autonomous driving environments, such as by providing sensor data to higher level vehicles, using sensor data to enhance GPS and infotainment services within the vehicle, etc.). In some implementations, a single vehicle may support operation at multiple autonomous driving levels. For instance, a driver may control and select which supported level of autonomy is used during a given trip (e.g., L4 or a lower level). In other cases, a vehicle may autonomously toggle between levels, for instance, based on conditions affecting the roadway or the vehicle's autonomous driving system. For example, in response to detecting that one or more sensors have been compromised, an L5 or L4 vehicle may shift to a lower mode (e.g., L2 or lower) to involve a human passenger in light of the sensor issue, among other examples.

Figure 12:
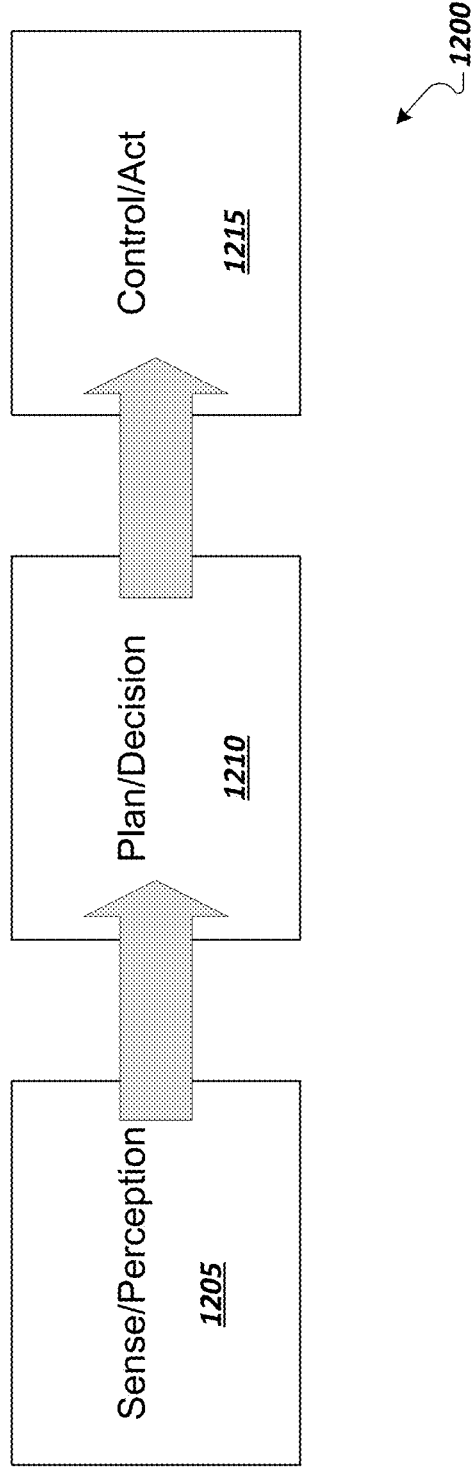
FIG. 12 is a simplified block diagram illustrating an example autonomous driving flow which may be implemented in some autonomous driving systems in accordance with certain embodiments.

FIG. 12 is a simplified block diagram 1200 illustrating an example autonomous driving flow which may be implemented in some autonomous driving systems. For instance, an autonomous driving flow implemented in an autonomous (or semi-autonomous) vehicle may include a sensing and perception stage 1205, a planning and decision stage 1210, and a control and action phase 1215. During a sensing and perception stage 1205 data is generated by various sensors and collected for use by the autonomous driving system. Data collection, in some instances, may include data filtering and receiving sensor from external sources. This stage may also include sensor fusion operations and object recognition and other perception tasks, such as localization, performed using one or more machine learning models. A planning and decision stage 1210 may utilize the sensor data and results of various perception operations to make probabilistic predictions of the roadway(s) ahead and determine a real time path plan based on these predictions. A planning and decision stage 1210 may additionally include making decisions relating to the path plan in reaction to the detection of obstacles and other events to decide on whether and what action to take to safely navigate the determined path in light of these events. Based on the path plan and decisions of the planning and decision stage 1210, a control and action stage 1215 may convert these determinations into actions, through actuators to manipulate driving controls including steering, acceleration, and braking, as well as secondary controls, such as turn signals, sensor cleaners, windshield wipers, headlights, etc.

Figure 13:
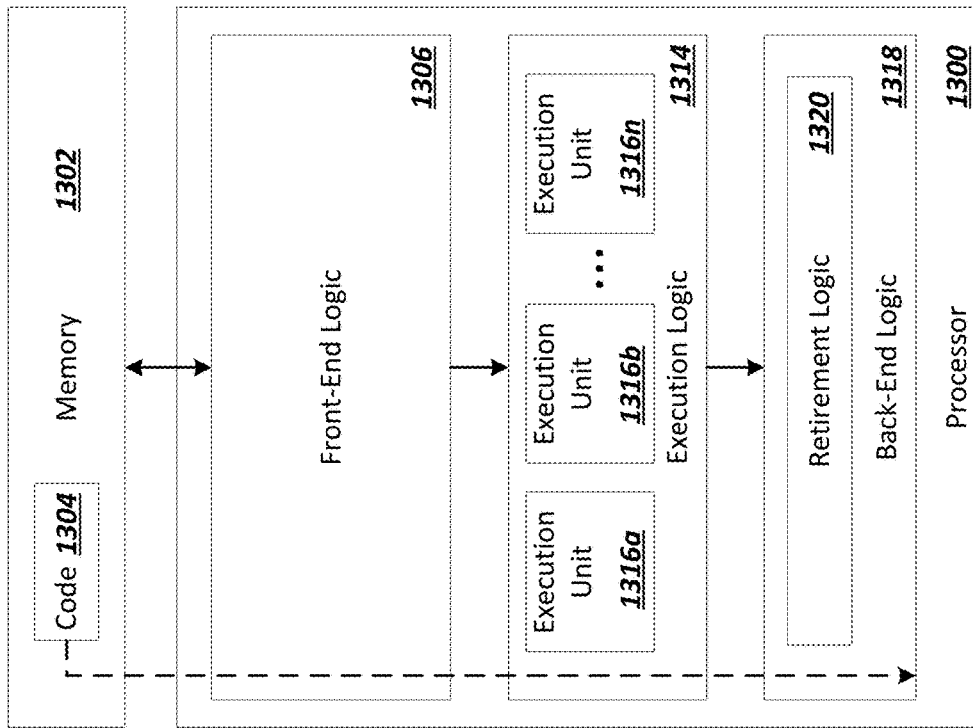
FIG. 13 is an example illustration of a processor in accordance with certain embodiments.
Figure 14:
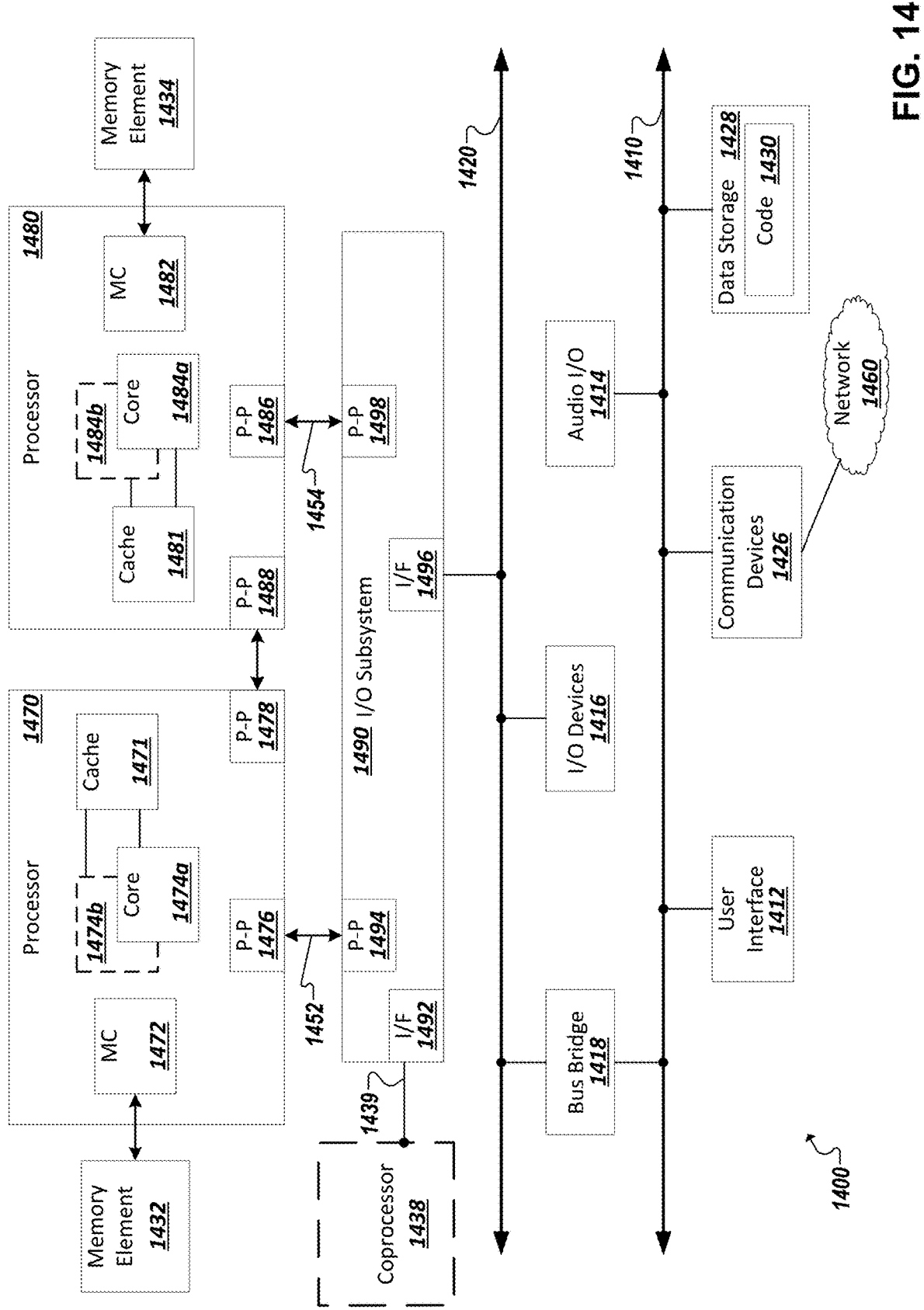
FIG. 14 illustrates a computing system that is arranged in a point-to-point (PtP) configuration in accordance with certain embodiments.

FIGS. 13-14 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 13-14.

FIG. 13 is an example illustration of a processor according to an embodiment. Processor 1300 is an example of a type of hardware device that can be used in connection with the implementations above. Processor 1300 may be any type of processor, such as a microprocessor, an embedded processor, a digital signal processor (DSP), a network processor, a multi-core processor, a single core processor, or other device to execute code. Although only one processor 1300 is illustrated in FIG. 13, a processing element may alternatively include more than one of processor 1300 illustrated in FIG. 13. Processor 1300 may be a single-threaded core or, for at least one embodiment, the processor 1300 may be multi-threaded in that it may include more than one hardware thread context (or "logical processor") per core.

FIG. 13 also illustrates a memory 1302 coupled to processor 1300 in accordance with an embodiment. Memory 1302 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1300 can execute any type of instructions associated with algorithms, processes, or operations detailed herein. Generally, processor 1300 can transform an element or an article (e.g., data) from one state or thing to another state or thing.

Code 1304, which may be one or more instructions to be executed by processor 1300, may be stored in memory 1302, or may be stored in software, hardware, firmware, or any suitable combination thereof, or in any other internal or external component, device, element, or object where appropriate and based on particular needs. In one example, processor 1300 can follow a program sequence of instructions indicated by code 1304. Each instruction enters a front-end logic 1306 and is processed by one or more decoders 1308. The decoder may generate, as its output, a micro operation such as a fixed width micro operation in a predefined format, or may generate other instructions, microinstructions, or control signals that reflect the original code instruction. Front-end logic 1306 also includes register renaming logic 1310 and scheduling logic 1312, which generally allocate resources and queue the operation corresponding to the instruction for execution.

Processor 1300 can also include execution logic 1314 having a set of execution units 1316*a*, 1316*b*, 1316*n*, etc. Some embodiments may include a number of execution units dedicated to specific functions or sets of functions. Other embodiments may include only one execution unit or one execution unit that can perform a particular function. Execution logic 1314 performs the operations specified by code instructions.

After completion of execution of the operations specified by the code instructions, back-end logic 1318 can retire the instructions of code 1304. In one embodiment, processor 1300 allows out of order execution but requires in order retirement of instructions. Retirement logic 1320 may take a variety of known forms (e.g., re-order buffers or the like). In this manner, processor 1300 is transformed during execution of code 1304, at least in terms of the output generated by the decoder, hardware registers and tables utilized by register renaming logic 1310, and any registers (not shown) modified by execution logic 1314.

Although not shown in FIG. 13, a processing element may include other elements on a chip with processor 1300. For example, a processing element may include memory control logic along with processor 1300. The processing element may include I/O control logic and/or may include I/O control logic integrated with memory control logic. The processing element may also include one or more caches. In some embodiments, non-volatile memory (such as flash memory or fuses) may also be included on the chip with processor 1300.

FIG. 14 illustrates a computing system 1400 that is arranged in a point-to-point (PtP) configuration according to an embodiment. In particular, FIG. 14 shows a system where processors, memory, and input/output devices are interconnected by a number of point-to-point interfaces. Generally, one or more of the computing systems described herein may be configured in the same or similar manner as computing system 1300.

Processors 1470 and 1480 may also each include integrated memory controller logic (MC) 1472 and 1482 to communicate with memory elements 1432 and 1434. In alternative embodiments, memory controller logic 1472 and 1482 may be discrete logic separate from processors 1470 and 1480. Memory elements 1432 and/or 1434 may store various data to be used by processors 1470 and 1480 in achieving operations and functionality outlined herein.

Processors 1470 and 1480 may be any type of processor, such as those discussed in connection with other figures. Processors 1470 and 1480 may exchange data via a point-to-point (PtP) interface 1450 using point-to-point interface circuits 1478 and 1488, respectively. Processors 1470 and 1480 may each exchange data with a chipset 1490 via individual point-to-point interfaces 1452 and 1454 using point-to-point interface circuits 1476, 1486, 1494, and 1498. Chipset 1490 may also exchange data with a co-processor 1438, such as a high-performance graphics circuit, machine learning accelerator, or other co-processor 1438, via an interface 1439, which could be a PtP interface circuit. In alternative embodiments, any or all of the PtP links illustrated in FIG. 14 could be implemented as a multi-drop bus rather than a PtP link.

Chipset 1490 may be in communication with a bus 1420 via an interface circuit 1496. Bus 1420 may have one or more devices that communicate over it, such as a bus bridge 1418 and I/O devices 1416. Via a bus 1410, bus bridge 1418 may be in communication with other devices such as a user interface 1412 (such as a keyboard, mouse, touchscreen, or other input devices), communication devices 1426 (such as modems, network interface devices, or other types of communication devices that may communicate through a computer network 1460), audio I/O devices 1414, and/or a data storage device 1428. Data storage device 1428 may store code 1430, which may be executed by processors 1470 and/or 1480. In alternative embodiments, any portions of the bus architectures could be implemented with one or more PtP links.

The computer system depicted in FIG. 14 is a schematic illustration of an embodiment of a computing system that may be utilized to implement various embodiments discussed herein. It will be appreciated that various components of the system depicted in FIG. 14 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

The following examples pertain to embodiments in accordance with this Specification. Example 1 is an apparatus comprising a memory to store a first image captured by a first camera and a second image captured by a second camera; and a processor coupled to the memory, the processor comprising circuitry, the processor to: identify viewpoint information defining a view for a stitched image, the stitched image to be generated from a combination of a plurality of images comprising the first image and the second image; and based on the viewpoint information and a projection type, determine transformation parameters for at least one reference region associated with overlapping regions of the first image and the second image in order to: localize overlapping regions of the first image and the second image to determine stitching parameters; combine the first image and the second image using the stitching parameters; and assign data of the combined first image and the second image to the stitched image.

Example 2 may include the subject matter of example 1, wherein the viewpoint information further comprises one or more rotation angles and one or more translation parameters.

Example 3 may include the subject matter of any of examples 1-2, wherein the processor is to generate the stitched image based on the viewpoint information using at least one additional pair of images of the plurality of images by: localizing overlapping regions of at least one additional pair of images to determine additional stitching parameters; combining the at least one additional pair of images using the additional stitching parameters; and assigning data of the combined at least one additional pair of images to the stitched image.

Example 4 may include the subject matter of any of examples 1-3, wherein the stitching parameters comprise a configurable blending mask based on a projection type of the first image and the second image and the processor is further to combine the first image with the second image based at least in part on the configurable blending mask.

Example 5 may include the subject matter of example 4, wherein the processor is to generate the configurable blending mask by transforming a reference blending mask associated with one or more of the at least one reference region.

Example 6 may include the subject matter of any of examples 1-5, wherein the stitching parameters comprise at least one adjustment factor based on statistics associated with the overlapping regions and the processor is further to combine the first image with the second image based at least in part on the at least one adjustment factor.

Example 7 may include the subject matter of example 6, wherein the processor is to perform at least one of: generate the at least one adjustment factor, wherein the at least one adjustment factor specifies an adjustment of one of brightness and color of pixels of the first image and the second image; and modify one or more of the at least one adjustment factor to prevent at least one of undershoots and overshoots of pixel values in the stitched image.

Example 8 may include the subject matter of example 6, wherein the processor is to determine the stitching parameters based on a combination of the at least one adjustment factor and a configurable blending mask based on a projection type of the first image and the second image.

Example 9 may include the subject matter of any of examples 1-8, wherein the processor is to: detect at least one of common features and points in the first image and the second image through at least one of image analysis, feature extraction and matching, corner detection, template matching, semantic segmentation, object detection, image registration, and trained classifiers; and use the detected at least one of common features or points to refine a determined location of the overlapping regions of the first image and the second image or adjust at least one of the first image and the second image through geometric transformation prior to localizing the overlapping regions of the first image and the second image.

Example 10 may include the subject matter of any of examples 1-9, wherein the processor is further to perform at least one of: suppress errors in the combination of the first image and second image caused by one or more of data alignment, image registration, feature extraction, matching, and repetition, ghosting due to motion, and parallax; and utilize at least one of object segmentation, semantic processing, depth information, and multiresolution analysis in the combination of the first image and second image.

Example 11 may include the subject matter of any of examples 1-10, wherein the processor comprises: a first multi-camera stitching module to combine the first image and the second image using the stitching parameters; and a second multi-camera stitching module to, based on at least one of second viewpoint information different from the viewpoint information and a second projection type different from the projection type: localize overlapping regions of two images of the plurality of images to determine second stitching parameters; combine the two images of the plurality of images using the second stitching parameters; and assign the data of the combined two images of the plurality of images to a second stitched image.

Example 12 may include the subject matter of example 11, wherein the two images include the first image and the second image.

Example 13 may include the subject matter of any of examples 1-12, wherein the processor comprises: a first multi-camera stitching module to generate intermediate image data using the plurality of images based on at least one of the viewpoint information and the projection type, the first multi-camera stitching module to further produce a first view from the generated intermediate image data; and a second multi-camera stitching module to produce a second view from the generated intermediate image data based on at least one of second viewpoint information different from the viewpoint information and a second projection type different from the first projection type.

Example 14 may include the subject matter of any of examples 1-13, wherein the processor is to specify at least one of the viewpoint information defining a view for a stitched image for at least one of the viewpoint and the projection type based on a driving situation and image or scene analysis.

Example 15 may include the subject matter of any of examples 1-14, wherein the at least one transformation parameter is determined based on at least one other transformation parameter associated with one or more tuning viewpoints.

Example 16 may include the subject matter of example 15, wherein the processor is to perform at least one of: select the one or more tuning viewpoints based on at least one of a difference and similarity between the one or more tuning viewpoints and a viewpoint specified by the viewpoint information; and adjust the at least one other transformation parameter associated with the one or more tuning viewpoints with respect to a reference viewpoint.

Example 17 may include the subject matter of any of examples 1-16, wherein the at least one transformation parameter is determined using at least one of linear transformation and perspective transformation based on a change in at least one of the viewpoint information and the projection type.

Example 18 includes a method comprising: identifying viewpoint information defining a view for a stitched image, the stitched image to be generated from a combination of a plurality of images comprising a first image and a second image; and based on the viewpoint information and a projection type, determine transformation parameters for at least one reference region associated with overlapping regions of the first image and the second image in order to: localizing overlapping regions of the first image and the second image to determine stitching parameters; combining the first image and the second image using the stitching parameters; and assigning data of the combined first image and the second image to the stitched image.

Example 19 may include the subject matter of example 18, wherein the at least one transformation parameter comprises one or more rotation angles and one or more translation parameters.

Example 20 may include the subject matter of any of examples 18-19, further comprising generating the stitched image based on the viewpoint information using at least one additional pair of images of the plurality of images by: localizing overlapping regions of at least one additional pair of images to determine additional stitching parameters; combining the at least one additional pair of images using the additional stitching parameters; and assigning data of the combined at least one additional pair of images to the stitched image.

Example 21 may include the subject matter of any of examples 18-20, wherein the stitching parameters comprise a configurable blending mask based on a projection type of the first image and the second image and the processor is further to combine the first image with the second image based at least in part on the configurable blending mask.

Example 22 may include the subject matter of example 21, wherein the configurable blending mask is generated by transforming a reference blending mask associated with one or more of the at least one reference region.

Example 23 may include the subject matter of any of examples 18-22, wherein the stitching parameters comprise at least one adjustment factor based on statistics associated with the overlapping regions and the processor is further to combine the first image with the second image based at least in part on the at least one adjustment factor.

Example 24 may include the subject matter of example 23, further comprising at least one of: generating the at least one adjustment factor, wherein the at least one adjustment factor specifies an adjustment of one of brightness and color of pixels of the first image and the second image; and modifying one or more of the at least one adjustment factor to prevent at least one of undershoots and overshoots of pixel values in the stitched image.

Example 25 may include the subject matter of example 23, further comprising determining the stitching parameters based on a combination of the at least one adjustment factor and a configurable blending mask based on a projection type of the first image and the second image.

Example 26 may include the subject matter of any of examples 18-25, further comprising detecting at least one of common features and points in the first image and the second image through at least one of image analysis, feature extraction and matching, corner detection, template matching, semantic segmentation, object detection, image registration, and trained classifiers; and using the detected at least one of common features or points to refine a determined location of the overlapping regions of the first image and the second image or adjust at least one of the first image and the second image through geometric transformation prior to localizing the overlapping regions of the first image and the second image.

Example 27 may include the subject matter of any of examples 18-26, further comprising performing at least one of: suppress errors in the combination of the first image and second image caused by one or more of data alignment, image registration, feature extraction, matching, and repetition, ghosting due to motion, and parallax; and utilize at least one of object segmentation, semantic processing, depth information, and multiresolution analysis in the combination of the first image and second image.

Example 28 may include the subject matter of any of examples 18-27, further comprising combining, by a first multi-camera stitching module, the first image and the second image using the stitching parameters; and, by a second multi-camera stitching module: based on at least one of second viewpoint information different from the viewpoint information and a second projection type different from the projection type: localize overlapping regions of two images of the plurality of images to determine second stitching parameters; combine the two images of the plurality of images using the second stitching parameters; and assign the data of the combined two images of the plurality of images to a second stitched image.

Example 29 may include the subject matter of example 28, wherein the two images include the first image and the second image.

Example 30 may include the subject matter of any of examples 18-29, further comprising generating, by a first multi-camera stitching module, intermediate image data using the plurality of images based on at least one of the viewpoint information and the projection type, the first multi-camera stitching module to further produce a first view from the generated intermediate image data; and producing, by a second multi-camera stitching module, a second view from the generated intermediate image data based on at least one of second viewpoint information different from the viewpoint information and a second projection type different from the first projection type.

Example 31 may include the subject matter of any of examples 18-30, further comprising specifying at least one of the viewpoint information defining a view for a stitched image for at least one of the viewpoint and the projection type based on a driving situation and image or scene analysis.

Example 32 may include the subject matter of any of examples 18-31, wherein the at least one transformation parameter is determined based on at least one other transformation parameter associated with one or more tuning viewpoints.

Example 33 may include the subject matter of example 32, wherein the processor is to perform at least one of: select the one or more tuning viewpoints based on at least one of a difference and similarity between the one or more tuning viewpoints and a viewpoint specified by the viewpoint information; and adjust the at least one other transformation parameter associated with the one or more tuning viewpoints with respect to a reference viewpoint.

Example 34 may include the subject matter of any of examples 18-33, wherein the at least one transformation parameter is determined using at least one of linear transformation and perspective transformation based on a change in at least one of the viewpoint information and the projection type.

Example 35 may include at least one non-transitory machine readable storage medium having instructions stored thereon, the instructions when executed by a machine to cause the machine to: identify viewpoint information defining a view for a stitched image, the stitched image to be generated from a combination of a plurality of images comprising a first image and a second image; and based on the viewpoint information and a projection type, determine transformation parameters for at least one reference region associated with overlapping regions of the first image and the second image in order to: localize overlapping regions of the first image and the second image to determine stitching parameters; combine the first image and the second image using the stitching parameters; and assign data of the combined first image and the second image to the stitched image.

Example 36 may include the subject matter of example 35, wherein the at least one translation parameter comprises one or more rotation angles and one or more translation parameters.

Example 37 may include the subject matter of any of examples 35-36, the instructions when executed by a machine to cause the machine to generate the stitched image based on the viewpoint information using at least one additional pair of images of the plurality of images by: localizing overlapping regions of at least one additional pair of images to determine additional stitching parameters; combining the at least one additional pair of images using the additional stitching parameters; and assigning data of the combined at least one additional pair of images to the stitched image.

Example 38 may include the subject matter of any of examples 35-37, wherein the stitching parameters comprise a configurable blending mask based on a projection type of the first image and the second image and the processor is further to combine the first image with the second image based at least in part on the configurable blending mask.

Example 39 may include the subject matter of example 38, the instructions to cause the machine to generate the configurable blending mask by transforming a reference blending mask associated with one or more of the at least one reference region.

Example 40 may include the subject matter of any of examples 35-39, wherein the stitching parameters comprise at least one adjustment factor based on statistics associated with the overlapping regions and the processor is further to combine the first image with the second image based at least in part on the at least one adjustment factor.

Example 41 may include the subject matter of example 40, wherein the instructions when executed by a machine to cause the machine to perform at least one of: generate the at least one adjustment factor, wherein the at least one adjustment factor specifies an adjustment of one of brightness and color of pixels of the first image and the second image; and modify one or more of the at least one adjustment factor to prevent at least one of undershoots and overshoots of pixel values in the stitched image.

Example 42 may include the subject matter of any of examples 35-41, the instructions when executed by a machine to cause the machine to determine the stitching parameters based on a combination of the at least one adjustment factor and a configurable blending mask based on a projection type of the first image and the second image.

Example 43 may include the subject matter of any of examples 35-42, the instructions when executed by a machine to cause the machine to detect at least one of common features and points in the first image and the second image through at least one of image analysis, feature extraction and matching, corner detection, template matching, semantic segmentation, object detection, image registration, and trained classifiers; and use the detected at least one of common features or points to refine a determined location of the overlapping regions of the first image and the second image or adjust at least one of the first image and the second image through geometric transformation prior to localizing the overlapping regions of the first image and the second image.

Example 44 may include the subject matter of any of examples 35-43, the instructions when executed by a machine to cause the machine to perform at least one of: suppress errors in the combination of the first image and second image caused by one or more of data alignment, image registration, feature extraction, matching, and repetition, ghosting due to motion, and parallax; and utilize at least one of object segmentation, semantic processing, depth information, and multiresolution analysis in the combination of the first image and second image.

Example 45 may include the subject matter of any of examples 35-44, wherein the machine comprises: a first multi-camera stitching module to combine the first image and the second image using the stitching parameters; and a second multi-camera stitching module to, based on at least one of second viewpoint information different from the viewpoint information and a second projection type different from the projection type: localize overlapping regions of two images of the plurality of images to determine second stitching parameters; combine the two images of the plurality of images using the second stitching parameters; and assign the data of the combined two images of the plurality of images to a second stitched image.

Example 46 may include the subject matter of example 45, wherein the two images include the first image and the second image.

Example 47 may include the subject matter of any of examples 35-46, wherein the machine comprises: a first multi-camera stitching module to generate intermediate image data using the plurality of images based on at least one of the viewpoint information and the projection type, the first multi-camera stitching module to further produce a first view from the generated intermediate image data; and a second multi-camera stitching module to produce a second view from the generated intermediate image data based on at least one of second viewpoint information different from the viewpoint information and a second projection type different from the first projection type.

Example 48 may include the subject matter of any of examples 35-47, wherein the instructions are further to cause the machine to specify at least one of the viewpoint information defining a view for a stitched image for at least one of the viewpoint and the projection type based on a driving situation and image or scene analysis.

Example 49 may include the subject matter of any of examples 35-48, wherein the at least one transformation parameter is determined based on at least one other transformation parameter associated with one or more tuning viewpoints.

Example 50 may include the subject matter of example 49, wherein the processor is to perform at least one of: select the one or more tuning viewpoints based on at least one of a difference and similarity between the one or more tuning viewpoints and a viewpoint specified by the viewpoint information; and adjust the at least one other transformation parameter associated with the one or more tuning viewpoints with respect to a reference viewpoint.

Example 51 may include the subject matter of any of examples 35-50, wherein the at least one transformation parameter is determined using at least one of linear transformation and perspective transformation based on a change in at least one of the viewpoint information and the projection type.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. An apparatus comprising:
    a memory to store a first image captured by a first camera and a second image captured by a second camera; and
    a processor coupled to the memory, the processor comprising circuitry, the processor to:
        identify viewpoint information defining a viewpoint from which a stitched image is to be rendered and viewed, the stitched image to be generated from a combination of a plurality of images comprising the first image and the second image; and
        based on the viewpoint information and a projection type, determine at least one transformation parameter for at least one reference region associated with overlapping regions of the first image and the second image in order to:
            localize overlapping regions of the first image and the second image to determine stitching parameters;
            combine the first image and the second image using the stitching parameters; and
            assign data of the combined first image and the second image to the stitched image.

2. The apparatus of claim 1, wherein the at least one transformation parameter based on the viewpoint information and the configurable projection type comprises one or more three dimensional rotation parameters and one or more three dimensional translation parameters.

3. The apparatus of claim 1, wherein the processor is to generate the stitched image based on the viewpoint information using at least one additional pair of images of the plurality of images by:
    localizing overlapping regions of at least one additional pair of images to determine additional stitching parameters;
    combining the at least one additional pair of images using the additional stitching parameters; and
    assigning data of the combined at least one additional pair of images to the stitched image.

4. The apparatus of claim 1, wherein the stitching parameters comprise a configurable blending mask based on a projection type of the first image and the second image and the processor is further to combine the first image with the second image based at least in part on the configurable blending mask.

5. The apparatus of claim 4, wherein the processor is to generate the configurable blending mask by transforming a reference blending mask associated with one or more of the at least one reference region.

6. The apparatus of claim 1, wherein the stitching parameters comprise at least one adjustment factor based on statistics associated with the overlapping regions and the processor is further to combine the first image with the second image based at least in part on the at least one adjustment factor.

7. The apparatus of claim 6, wherein the processor is to perform at least one of:
    generate the at least one adjustment factor, wherein the at least one adjustment factor specifies an adjustment of one of brightness and color of pixels of the first image and the second image; and
    modify one or more of the at least one adjustment factor to prevent at least one of undershoots and overshoots of pixel values in the stitched image.

8. The apparatus of claim 6, wherein the processor is to determine the stitching parameters based on a combination of the at least one adjustment factor and a configurable blending mask based on a projection type of the first image and the second image.

9. The apparatus of claim 1, wherein the processor is to:
detect at least one of common features and points in the first image and the second image through at least one of image analysis, feature extraction and matching, corner detection, template matching, semantic segmentation, object detection, image registration, and trained classifiers; and
use the detected at least one of common features or points to refine a determined location of the overlapping regions of the first image and the second image or adjust at least one of the first image and the second image through geometric transformation prior to localizing the overlapping regions of the first image and the second image.

10. The apparatus of claim 1, wherein the processor is further to perform at least one of:
suppress errors in the combination of the first image and second image caused by one or more of data alignment, image registration, feature extraction, matching, and repetition, ghosting due to motion, and parallax; and
utilize at least one of object segmentation, semantic processing, depth information, and multiresolution analysis in the combination of the first image and second image.

11. The apparatus of claim 1, wherein the processor comprises:
a first multi-camera stitching module to combine the first image and the second image using the stitching parameters; and
a second multi-camera stitching module to, based on at least one of second viewpoint information different from the viewpoint information and a second projection type different from the projection type:
localize overlapping regions of two images of the plurality of images to determine second stitching parameters;
combine the two images of the plurality of images using the second stitching parameters; and
assign the data of the combined two images of the plurality of images to a second stitched image.

12. The apparatus of claim 11, wherein the two images include the first image and the second image.

13. The apparatus of claim 1, wherein the processor comprises:
a first multi-camera stitching module to generate intermediate image data using the plurality of images based on at least one of the viewpoint information and the projection type, the first multi-camera stitching module to further produce a first view from the generated intermediate image data; and
a second multi-camera stitching module to produce a second view from the generated intermediate image data based on at least one of second viewpoint information different from the viewpoint information and a second projection type different from the first projection type.

14. The apparatus of claim 1, wherein the processor is to specify at least one of the viewpoint information defining a view for a stitched image for at least one of the viewpoint and the projection type based on a driving situation and image or scene analysis.

15. The apparatus of claim 1, wherein the at least one transformation parameter is determined based on at least one other transformation parameter associated with one or more tuning viewpoints.

16. The apparatus of claim 15, wherein the processor is to perform at least one of:
select the one or more tuning viewpoints based on at least one of a difference and similarity between the one or more tuning viewpoints and a viewpoint specified by the viewpoint information; and
adjust the at least one other transformation parameter associated with the one or more tuning viewpoints with respect to a reference viewpoint.

17. The apparatus of claim 1, wherein the at least one transformation parameter is determined using at least one of linear transformation and perspective transformation based on a change in at least one of the viewpoint information and the projection type.

18. A method comprising:
identifying viewpoint information defining a viewpoint from which a stitched image is to be rendered and viewed, the stitched image to be generated from a combination of a plurality of images comprising a first image and a second image; and
based on the viewpoint information and a projection type, determine transformation parameters for at least one reference region associated with overlapping regions of the first image and the second image in order to:
localizing overlapping regions of the first image and the second image to determine stitching parameters;
combining the first image and the second image using the stitching parameters; and
assigning data of the combined first image and the second image to the stitched image.

19. The method of claim 18, wherein the at least one transformation parameter comprises one or more rotation parameters and one or more translation parameters.

20. The method of claim 18, wherein the stitching parameters comprise a configurable blending mask based on a projection type of the first image and the second image and the processor is further to combine the first image with the second image based at least in part on the configurable blending mask.

21. The method of claim 18, wherein the stitching parameters comprise at least one adjustment factor based on statistics associated with the overlapping regions and the processor is further to combine the first image with the second image based at least in part on the at least one adjustment factor.

22. At least one non-transitory machine readable storage medium having instructions stored thereon, the instructions when executed by a machine to cause the machine to:
identify viewpoint information defining a viewpoint from which a stitched image is to be rendered and viewed, the stitched image to be generated from a combination of a plurality of images comprising a first image and a second image; and
based on the viewpoint information and a projection type, determine transformation parameters for at least one reference region associated with overlapping regions of the first image and the second image in order to:
localize overlapping regions of the first image and the second image to determine stitching parameters;
combine the first image and the second image using the stitching parameters; and
assign data of the combined first image and the second image to the stitched image.

23. The at least one non-transitory machine readable storage medium of claim 22, wherein the stitching parameters comprise a configurable blending mask based on a projection type of the first image and the second image and the processor is further to combine the first image with the second image based at least in part on the configurable blending mask.

24. The at least one non-transitory machine readable storage medium of claim 22, wherein the stitching parameters comprise at least one adjustment factor based on statistics associated with the overlapping regions and the processor is further to combine the first image with the second image based at least in part on the at least one adjustment factor.

25. The apparatus of claim 1, wherein the viewpoint information and the projection type are dynamically specified by a user or computing entity.

* * * * *